US012682394B2

(12) United States Patent
Raghavan et al.

(10) Patent No.: US 12,682,394 B2
(45) Date of Patent: Jul. 14, 2026

(54) BUDGET ALERT DISPLAY IN AN ELECTRONIC DEVICE TO PREVENT OVER-BUDGET TRANSACTIONS

(71) Applicant: MOTOROLA MOBILITY LLC, Wilmington, DE (US)

(72) Inventors: Krishnan Raghavan, Bangalore (IN); Nakul Patel, Nagpur (IN); A G Prasad, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 124 days.

(21) Appl. No.: 18/536,788

(22) Filed: Dec. 12, 2023

(65) Prior Publication Data

US 2025/0191059 A1    Jun. 12, 2025

(51) Int. Cl.
*G06Q 40/02* (2023.01)
*G06Q 30/0601* (2023.01)

(52) U.S. Cl.
CPC ......... *G06Q 40/02* (2013.01); *G06Q 30/0641* (2013.01)

(58) Field of Classification Search
None
See application file for complete search history.

(56) References Cited

U.S. PATENT DOCUMENTS

| | | | | |
|---|---|---|---|---|
| 2007/0260532 A1* | 11/2007 | Blake, III | .............. | G06Q 40/00 705/35 |
| 2012/0239564 A1* | 9/2012 | Summerrow | .......... | G06Q 20/28 705/41 |
| 2013/0030994 A1* | 1/2013 | Calman | .................. | G06Q 40/00 705/40 |
| 2016/0071201 A1* | 3/2016 | Zhang | .................... | G06Q 40/00 705/35 |
| 2020/0126151 A1* | 4/2020 | Botella | .............. | G06Q 20/0855 |
| 2021/0150624 A1* | 5/2021 | Tucker | ................. | G06Q 20/405 |
| 2024/0220995 A1* | 7/2024 | Verma | .................... | G06N 20/00 |

* cited by examiner

*Primary Examiner* — Paul S Schwarzenberg
(74) *Attorney, Agent, or Firm* — Isidore PLLC

(57) ABSTRACT

An electronic device, a method and a computer program product for presenting budget alerts for budget categories. The method includes detecting a trigger indicative of an intended transaction that falls within a first budget category having a budgeted amount for at least one budget period. In response to detecting the trigger, the method includes transmitting, to a budget tracking repository, a request for budget data. The budget data includes a first budget amount and current spend amount for the first budget category. The method includes identifying an over-budget condition by determining that a sum of a payment amount for the intended transaction and the current spend amount is greater than the first budget amount. In response to identifying the over-budget condition, the method includes presenting a budget alert on a display. The budget alert indicates that the first budget amount will be exceeded, if the intended transaction is completed.

20 Claims, 11 Drawing Sheets

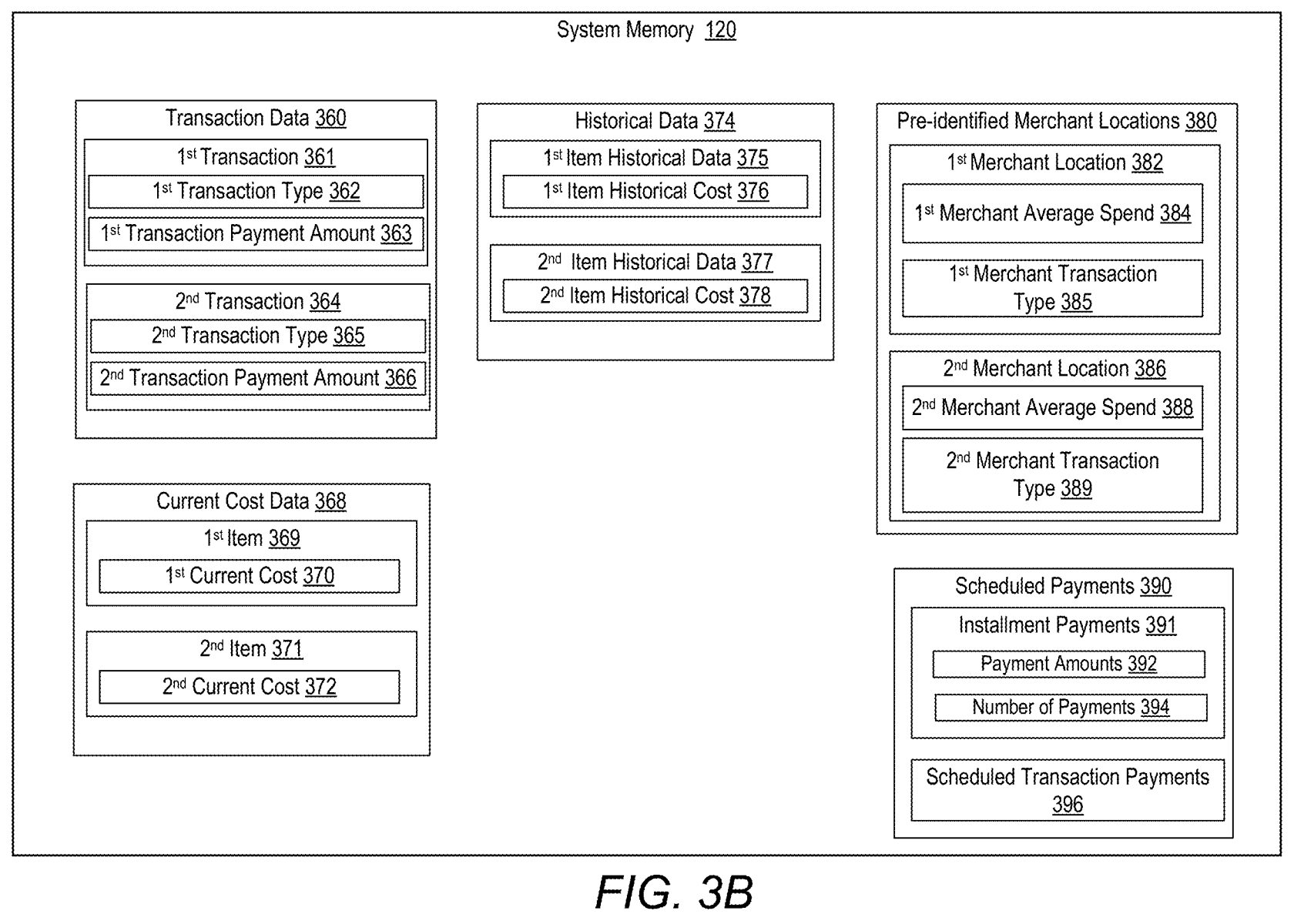

System Memory 120

Pre-identified Merchant Locations 380

1st Merchant Location 382

1st Merchant Average Spend 384

1st Merchant Transaction Type 385

2nd Merchant Location 386

2nd Merchant Average Spend 388

2nd Merchant Transaction Type 389

Scheduled Payments 390

Installment Payments 391

Payment Amounts 392

Number of Payments 394

Scheduled Transaction Payments 396

Historical Data 374

1st Item Historical Data 375

1st Item Historical Cost 376

2nd Item Historical Data 377

2nd Item Historical Cost 378

Transaction Data 360

1st Transaction 361

1st Transaction Type 362

1st Transaction Payment Amount 363

2nd Transaction 364

2nd Transaction Type 365

2nd Transaction Payment Amount 366

Current Cost Data 368

1st Item 369

1st Current Cost 370

2nd Item 371

2nd Current Cost 372

FIG. 3B

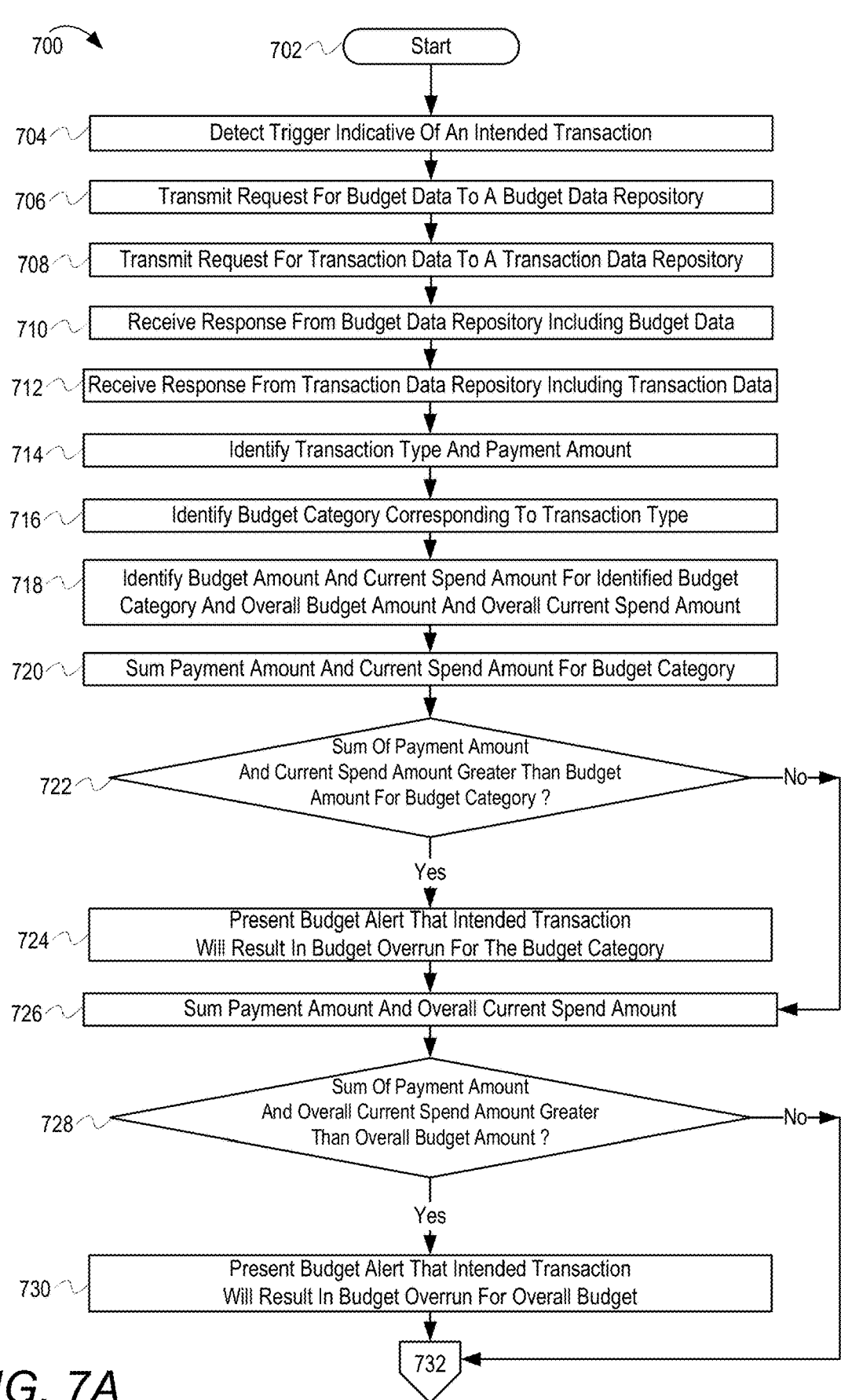

700

702 — Start

704 — Detect Trigger Indicative Of An Intended Transaction

706 — Transmit Request For Budget Data To A Budget Data Repository

708 — Transmit Request For Transaction Data To A Transaction Data Repository

710 — Receive Response From Budget Data Repository Including Budget Data

712 — Receive Response From Transaction Data Repository Including Transaction Data 714 — Identify Transaction Type And Payment Amount 716 — Identify Budget Category Corresponding To Transaction Type 718 — Identify Budget Amount And Current Spend Amount For Identified Budget Category And Overall Budget Amount And Overall Current Spend Amount 720 — Sum Payment Amount And Current Spend Amount For Budget Category 722 — Sum Of Payment Amount And Current Spend Amount Greater Than Budget Amount For Budget Category ? — No Yes 724 — Present Budget Alert That Intended Transaction Will Result In Budget Overrun For The Budget Category 726 — Sum Payment Amount And Overall Current Spend Amount 728 — Sum Of Payment Amount And Overall Current Spend Amount Greater Than Overall Budget Amount ? — No Yes 730 — Present Budget Alert That Intended Transaction Will Result In Budget Overrun For Overall Budget

732 — Transaction Completed ?     No

Yes

734 — Update Current Spend Amount For Budget Category And Overall Current Spend Amount 736 — Transmit Updated Current Spend Amount For Budget Category And Overall Current Spend Amount To Budget Data Repository 750 — End

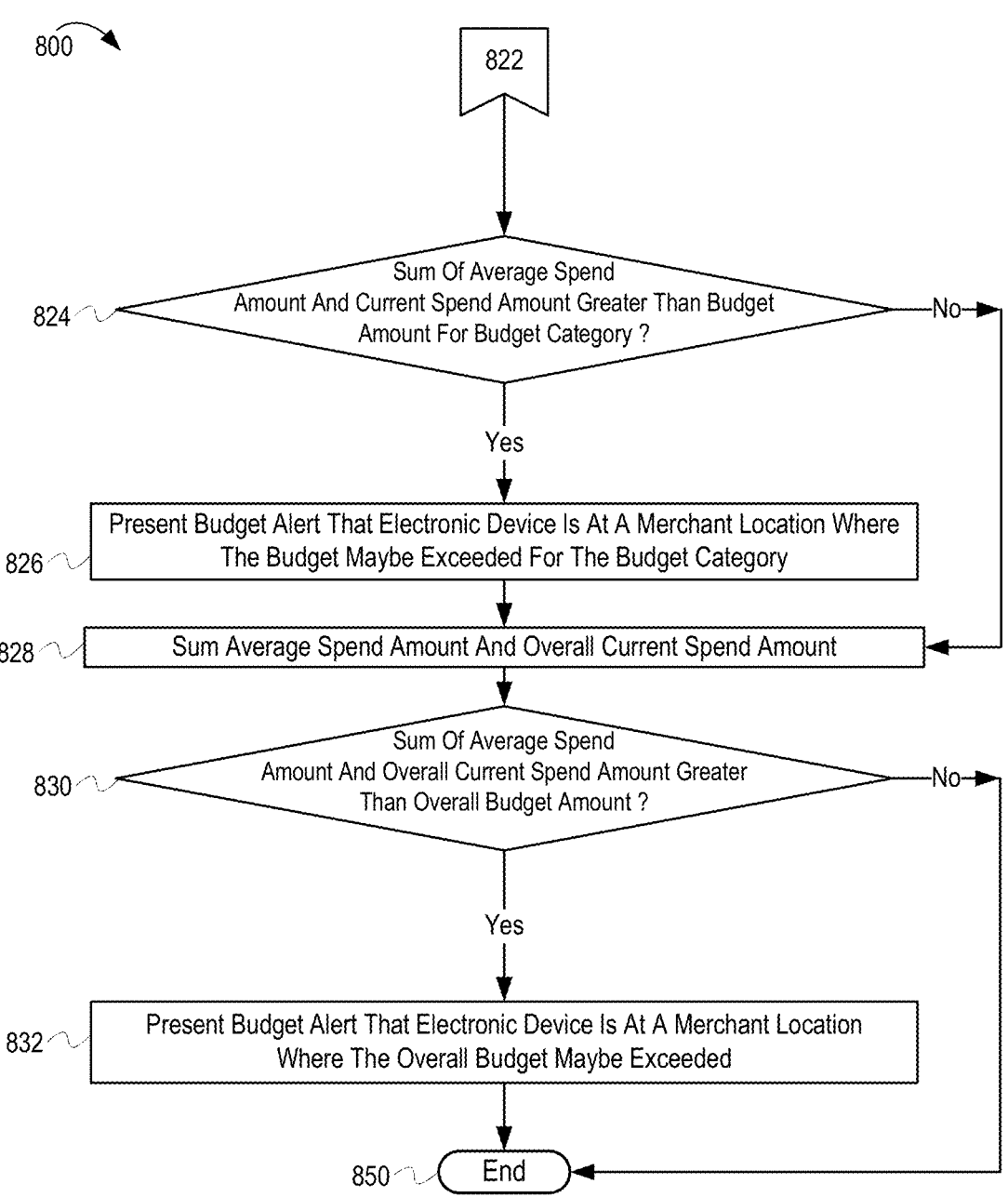

800

822

824 — Sum Of Average Spend Amount And Current Spend Amount Greater Than Budget Amount For Budget Category ? — No Yes 826 — Present Budget Alert That Electronic Device Is At A Merchant Location Where The Budget Maybe Exceeded For The Budget Category 828 — Sum Average Spend Amount And Overall Current Spend Amount 830 — Sum Of Average Spend Amount And Overall Current Spend Amount Greater Than Overall Budget Amount ? — No Yes 832 — Present Budget Alert That Electronic Device Is At A Merchant Location Where The Overall Budget Maybe Exceeded 850 — End

*FIG. 8B*

BUDGET ALERT DISPLAY IN AN ELECTRONIC DEVICE TO PREVENT OVER-BUDGET TRANSACTIONS

BACKGROUND

1. Technical Field

The present disclosure generally relates to electronic devices and in particular to presenting financial alerts on an electronic device.

2. Description of the Related Art

Electronic devices, such as mobile phones, tablets, and laptops, are widely used for video, voice, and text communication and for data transmission. Online shopping and completion of electronic commerce transactions using mobile electronic devices has also become a popular use for these devices. Online shopping is a form of electronic commerce which allows consumers to purchase goods or services using an electronic device. Consumers can find a product of interest by visiting retailer websites or by using a search engine that displays the availability and price of a product at different merchants. Electronic devices are also commonly used for other applications such as electronic banking. Digital wallets have become a popular option to use for electronic banking services. An electronic banking service can enable an electronic device to access stored bank account, credit card, debit card, or budget information. The electronic banking service enables an electronic device to complete payment and financial transactions with merchants and other individuals. An electronic banking service can store user banking information in a secure manner.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIGS. 3A and 3B are block diagrams of example contents of the system memory of the example electronic device of FIG. 1 configured to complete the various processes described herein, according to one or more embodiments;

FIGS. 7A and 7B depict a flowchart of a method by which an electronic device identifies an over-budget condition and presents a budget alert for at least one budget category, according to one or more embodiments; and FIGS. 8A and 8B depict a flowchart of a method by which an electronic device determines if the electronic device is at pre-identified merchant location where an over-budget condition can occur and presents a location-based budget alert, according to one or more embodiments.

DETAILED DESCRIPTION

Figure 1:
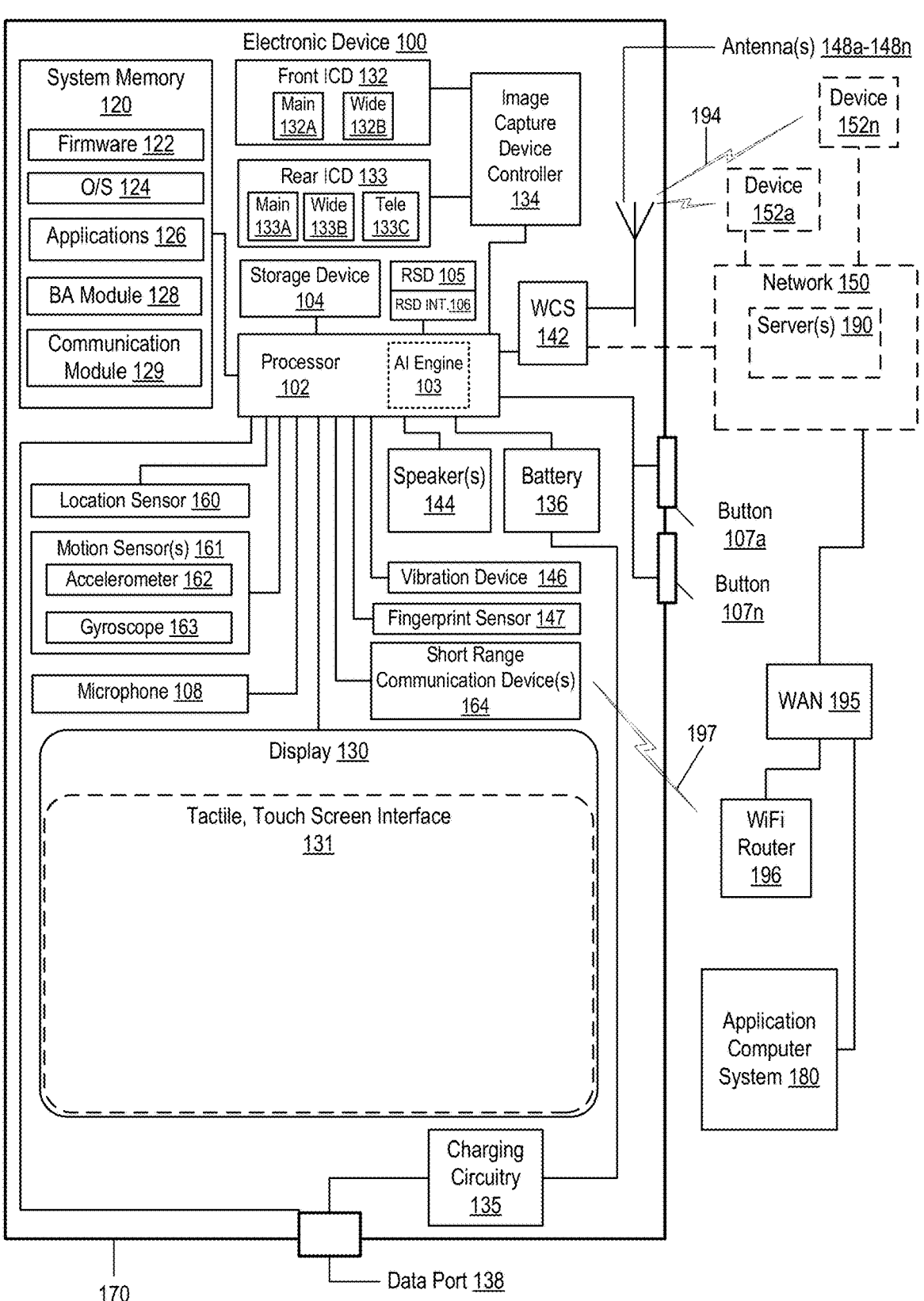
FIG. 1 depicts an example electronic device within which various aspects of the disclosure can be implemented, according to one or more embodiments.

According to one aspect of the disclosure, the illustrative embodiments provide an electronic device, a method, and a computer program product for presenting budget alerts for at least one budget category being monitored. In a first embodiment, an electronic device includes a display, a communication subsystem, and a memory having stored thereon a budget alert (BA) module for presenting budget alerts for at least one budget category. The electronic device includes at least one processor that is communicatively coupled to the display, the communication system, and the memory. The at least one processor executes program code of the budget alert module, which configures the electronic device to detect a trigger indicative of an intended transaction that falls within a first budget category having a budgeted amount for at least one budget period. In response to detecting the trigger, the at least one processor transmits, to a budget tracking repository, a request for budget data. The budget data includes a corresponding first budget amount and first current spend amount associated with the first budget category for the at least one budget period. The at least one processor identifies an over-budget condition by determining that a first sum of a first payment amount for the intended transaction and the first current spend amount is greater than the first budget amount. In response to identifying the over-budget condition, the at least one processor presents a first budget alert on the display. The first budget alert indicates that the first budget amount will be exceeded if the intended transaction is completed within the at least one budget period.

According to another embodiment, the method includes detecting, via at least one processor, a trigger indicative of an intended transaction that falls within a first budget category having a budgeted amount for at least one budget period. In response to detecting the trigger, the method includes transmitting, to a budget tracking repository, a request for budget data. The budget data includes a corresponding first budget amount and first current spend amount associated with the first budget category for the at least one budget period. The method includes identifying an over-budget condition by determining that a first sum of a first payment amount for the intended transaction and the first current spend amount is greater than the first budget amount. In response to identifying the over-budget condition, the method includes presenting a first budget alert on a display. The first budget alert indicated that the first budget amount will be exceeded if the intended transaction is completed within the at least one budget period.

According to an additional embodiment, a computer program product includes a computer readable storage device having stored thereon program code that, when executed by at least one processor of an electronic device having a display and a communication device, the program code enables the electronic device to complete the functionality of the above-described method processes.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within electronic device 100 (FIG. 1) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

FIG. 1 depicts an example electronic device 100 within which various aspects of the disclosure can be implemented, according to one or more embodiments. Examples of such electronic devices include, but are not limited to, mobile devices, a notebook computer, a mobile phone, a digital camera, a smart watch, a tablet computer, and a communication device, etc. It is appreciated that electronic device 100 can be other types of devices that include the capability to transmit and receive communications. Electronic device 100 includes processor 102, which is communicatively coupled to storage device 104, system memory 120, input devices, (introduced below), output devices, such as display 130, and image capture device (ICD) controller 134. In one or more embodiments, the functionality of ICD controller 134 is incorporated within processor 102, eliminating the need for a separate ICD controller. For simplicity in describing the features presented herein, the various camera control functions performed by the ICD controller 134 are described as being provided generally by processor 102. Processor 102 can include processor resources such as a primary processing unit (CPU) that support computing, classifying, processing and transmitting of data and information. Processor 102 can further include graphic processing units (GPU) and digital signal processors (DSP) that also support computing, classifying, processing and transmitting and receiving of data and information. Processor 102 can further include a hardware based artificial intelligence (AI) engine 103. AI engine 103 accelerates artificial intelligence, natural language processing (NLP), context evaluation (CE), and machine learning applications. AI engine 103 can also be implemented as a software module.

System memory 120 may be a combination of volatile and non-volatile memory, such as random access memory (RAM) and read-only memory (ROM). System memory 120 can store program code and data associated with firmware 122, an operating system 124, applications 126, budget alert (BA) module 128, and communication module 129. Budget alert module 128 includes program code that is executable by processor 102 to enable electronic device 100 to present budget alerts for at least one budget category, when an over-budget condition is identified. Communication module 129 includes program code that is executed by processor 102 to enable electronic device 100 to communicate with other external devices and systems.

Although depicted as being separate from applications 126, budget alert module 128 and communication module 129 may each be implemented as an application. Processor 102 loads and executes program code stored in system memory 120, including program code associated with applications 126 and program code associated with budget alert module 128 and communication module 129. When processed/executed by processor 102, the program code causes or configures electronic device 100 to provide the various functionality described herein.

In one or more embodiments, electronic device includes removable storage device (RSD) 105, which is inserted into an RSD interface 106 that is communicatively coupled via system interlink to processor 102. In one or more embodiments, RSD 105 is a non-transitory computer program product or computer readable storage device. In one or more embodiments, RSD 105 is a computer readable storage device encoded with program code and corresponding data, and RSD 105 can interchangeably be referred to as a non-transitory computer program product. RSD 105 may have a version of budget alert module 128 stored thereon, in addition to other program code. Processor 102 can access RSD 105 to provision electronic device 100 with program code that, when executed by processor 102, the program code causes or configures electronic device 100 to provide the functionality described herein.

Display 130 can be one of a wide variety of display screens or devices, such as a liquid crystal display (LCD) and an organic light emitting diode (OLED) display. In some embodiments, display 130 can be a touch screen device that can receive user tactile/touch input. As a touch screen device, display 130 includes a tactile, touch screen interface 131 that allows a user to provide input to or to control electronic device 100 by touching features presented within/below the display screen. Tactile, touch screen interface 131 can be utilized as an input device.

Throughout the disclosure, the term image capturing device is utilized interchangeably to be synonymous with and/or refer to any one of front or rear cameras 132, 133. As illustrated, electronic device 100 includes several front cameras 132. Electronic device 100 further includes several rear cameras 133. Each front camera 132A and 132B and each rear camera 133A, 133B and 133C is communicatively coupled to ICD controller 134, which is communicatively coupled to processor 102. ICD controller 134 supports the processing of signals from front cameras 132A and 132B and rear cameras 133A, 133B, and 133C.

Electronic device 100 can further include charging circuitry 135, battery 136, and data port 138, for providing electrical power to the various electronic components of electronic device 100. Electronic device 100 further includes microphone 108, one or more output devices such as speaker 144, and one or more input buttons 107a-n. Input buttons 107a-n may provide controls for volume, power, and/or image capture devices 132, 133. Microphone 108 can also be referred to as audio input device 108. Microphone 108 can be used to provide biometric data to identify or authenticate a user. Microphone 108 and input buttons 107a-n can also be referred to generally as input devices. Speaker 144 can provide an audio alert to a user.

Electronic device 100 further includes wireless communication subsystem (WCS) 142, which is coupled to antennas 148a-148n. In one or more embodiments, WCS 142 can include a communication module with one or more baseband processors or digital signal processors, one or more modems, and a radio frequency front end having one or more transmitters and one or more receivers. Wireless communication subsystem (WCS) 142 and antennas 148a-148n allow electronic device 100 to communicate wirelessly with wireless network 150 via transmissions of communication signals 194 to and from network communication devices 152a-152n, such as base stations or cellular nodes, of wireless network 150.

In one or more embodiment, wireless network 150 can include one or more servers 190 that support wireless exchange of voice, data, and video and other communication with electronic device 100. Wireless network 150 further allows electronic device 100 to communicate with an external application computer system 180. Application computer system 180 is communicatively coupled to wireless network 150 by a wide area network (WAN) 195, such as the Internet. In an embodiment, servers 190 of wireless network 150 support wireless exchange of e-mail, text, data, and other communications between electronic device 100 and application computer system 180. In one embodiment, application computer system 180 can provide data, information and resources to electronic device 100 for use with applications 126, and/or BA module 128.

Electronic device 100 further includes short range communication device(s) 164. Short-range communication device 164 is a low powered transceiver that can wirelessly communicate with other devices. Short-range communication device(s) 164 can include one or more of a variety of devices supporting different corresponding wireless protocols, such as a near field communication (NFC) device, a Bluetooth device, and/or a wireless fidelity (Wi-Fi) device. Electronic device 100 can also connect wirelessly to wireless network 150 via communication signals 197 transmitted by short-range communication device(s) 164 to and from WiFi router 196, which is communicatively coupled to WAN 195, such as the Internet. Wireless network 150 is communicatively coupled to WAN 195.

Short-range communication device(s) 164 can wirelessly communicate with WiFi router 196 via communication signals 197. In one embodiment, electronic device 100 can receive Internet or Wi-Fi based calls via short-range communication device(s) 164. In one embodiment, electronic device 100 can communicate with WiFi router 196 wirelessly via short-range communication device(s) 164. In an embodiment, WCS 142, antennas 148a-148n and short-range communication device(s) 164 collectively provide communication interface(s) of electronic device 100.

Electronic device 100 further includes vibration device 146, fingerprint sensor 147, location sensor 160, and motion sensor(s) 161. Vibration device 146 can cause electronic device 100 to vibrate or shake when activated. Vibration device 146 can be activated to provide an alert or notification to a user of electronic device 100. According to one aspect of the disclosure, display 130, speakers 144, and vibration device 146 can generally and collectively be referred to as output devices. These output devices can be each utilized to present the alert to the user.

Fingerprint sensor 147 can be used to provide biometric data or images to identify or authenticate a user. Location sensor 160 can provide time data and location data about the physical location of electronic device 100. In one embodiment, location sensor 160 can be a global positioning system (GPS) device that uses data received from geospatial input received from GPS satellites. Location information and data received from location sensor 160 can be utilized to identify when a user device is in close vicinity of a store or merchant from which an item can be purchased, where the purchase intent or price would be tracked within and count towards the budgeted amount.

Motion sensor(s) 161 can include one or more accelerometers 162 and gyroscope 163. Motion sensor(s) 161 can detect movement of electronic device 100 and provide motion data to processor 102 indicating the spatial orientation and movement of electronic device 100. Accelerometers 162 measure linear acceleration of movement of electronic device 100 in multiple axes (X, Y and Z). For example, accelerometers 162 can include three accelerometers, where one accelerometer measures linear acceleration in the X axis, one accelerometer measures linear acceleration in the Y axis, and one accelerometer measures linear acceleration in the Z axis. Gyroscope 163 measures rotation or angular rotational velocity of electronic device 100. Electronic device 100 further includes a housing 170 that contains the components of electronic device 100.

In the description of each of the following figures, reference is also made to specific components illustrated within the preceding figure(s). Similar or same components are presented with the same leading reference number.

Figure 2:
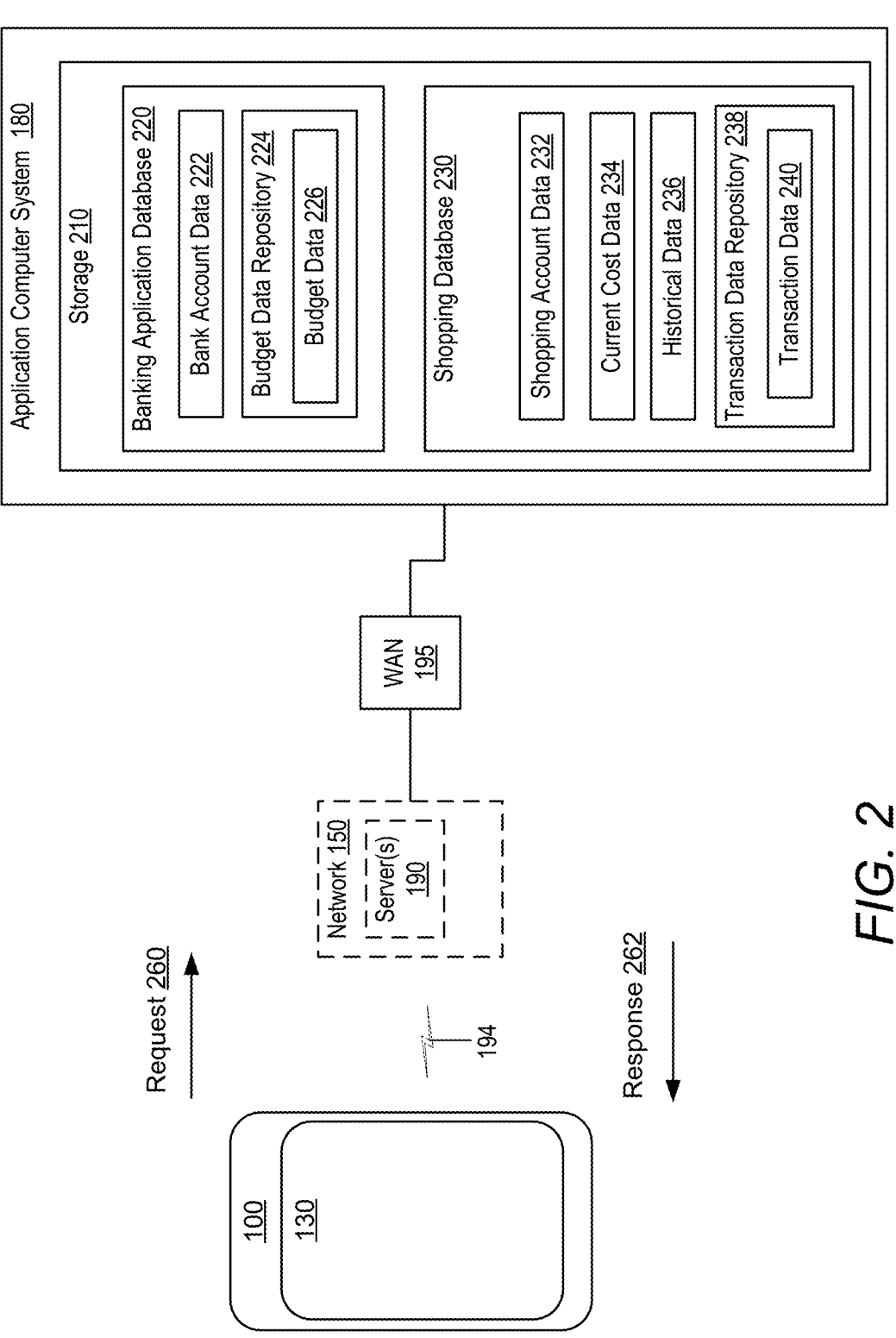
FIG. 2 is an example illustration of the electronic device of FIG. 1 transmitting a request for budget and transaction data to an application computer system and a receiving a response from the application computer system, according to one or more embodiments.

Turning to FIG. 2, with ongoing reference to FIG. 1, electronic device 100 is shown in communication with application computer system 180. Application computer system 180 is communicatively coupled to wireless network 150 by a wide area network (WAN) 195, such as the Internet. In an embodiment, servers 190 of wireless network 150 support wireless exchange of e-mail, text, data, and other communication between electronic device 100 and application computer system 180.

Electronic device 100 can communicate wirelessly with wireless network 150 via transmission and reception of communication signals 194. Communication network 150 includes communication servers 190 that are communicatively connected to a larger, wide area network (WAN) 195, such as the Internet. Electronic device 100 can also establish connection and communicate with wireless network 150 and with WAN 195 via WiFi router 196 and short-range communication device(s) 164 (FIG. 1).

Application computer system 180 can host one or more applications that provide various functions. Application computer system 180 includes storage 210, such as one or more hard drives or solid state drives. Storage 210 can store a banking application database 220 and a shopping database 230. Banking application database 220 and shopping database 230 can support one or more applications 126 of electronic device 100. Banking application database 220 includes bank account data 222 and a budget data repository 224. Bank account data 222 can include bank account information, credit and debit card information, and loan information. Budget data repository 224 can include budget data 226. In one embodiment, a user can provide budget data 226 based on a user's personal budget. A personal budget is a plan for allocating future income towards expenses, savings, investment, and/or debt payments. In an example embodiment, budget data 226 can include several budget categories and allocated amounts for each budget category. Budget categories can include groceries, restaurant and other food, clothing, rent/mortgage, utilities, entertainment, insurance, etc., for one or more budget periods.

Shopping database 230 includes shopping account data 232, current cost data 234, historical data 236 and transaction data repository 238. Transaction data repository 238 includes transaction data 240. Shopping account data 232 can include merchant information, preferred payment methods, and preferred shipping methods. Current cost data 234 can include the current cost of one or more items or services that are available for purchase at a merchant. Historical data 236 can include the cost of one or more items or services that have been previously purchased at a merchant. In one embodiment, historical data 236 can be gathered from the anonymous historical purchase information of other users.

Transaction data 240 includes data corresponding to a current transaction being performed via electronic device 100. Transaction data 240 can include a merchant identifier, an item or service identifier, a payment amount, and other data related to facilitating a transaction.

According to one aspect of the disclosure, electronic device 100 can transmit a request 260 to application computer system 180 for budget data 226, current cost data 234, historical data 236, and transaction data 240. Electronic device 100 can receive, in response to the request 260, a response 262 that contains the budget data 226, current cost data 234, historical data 236, and transaction data 240. Electronic device 100 and application computer system 180 can perform a validation and authentication routine prior to the exchange of data and information to provide account verification and security.

Figure 3A:
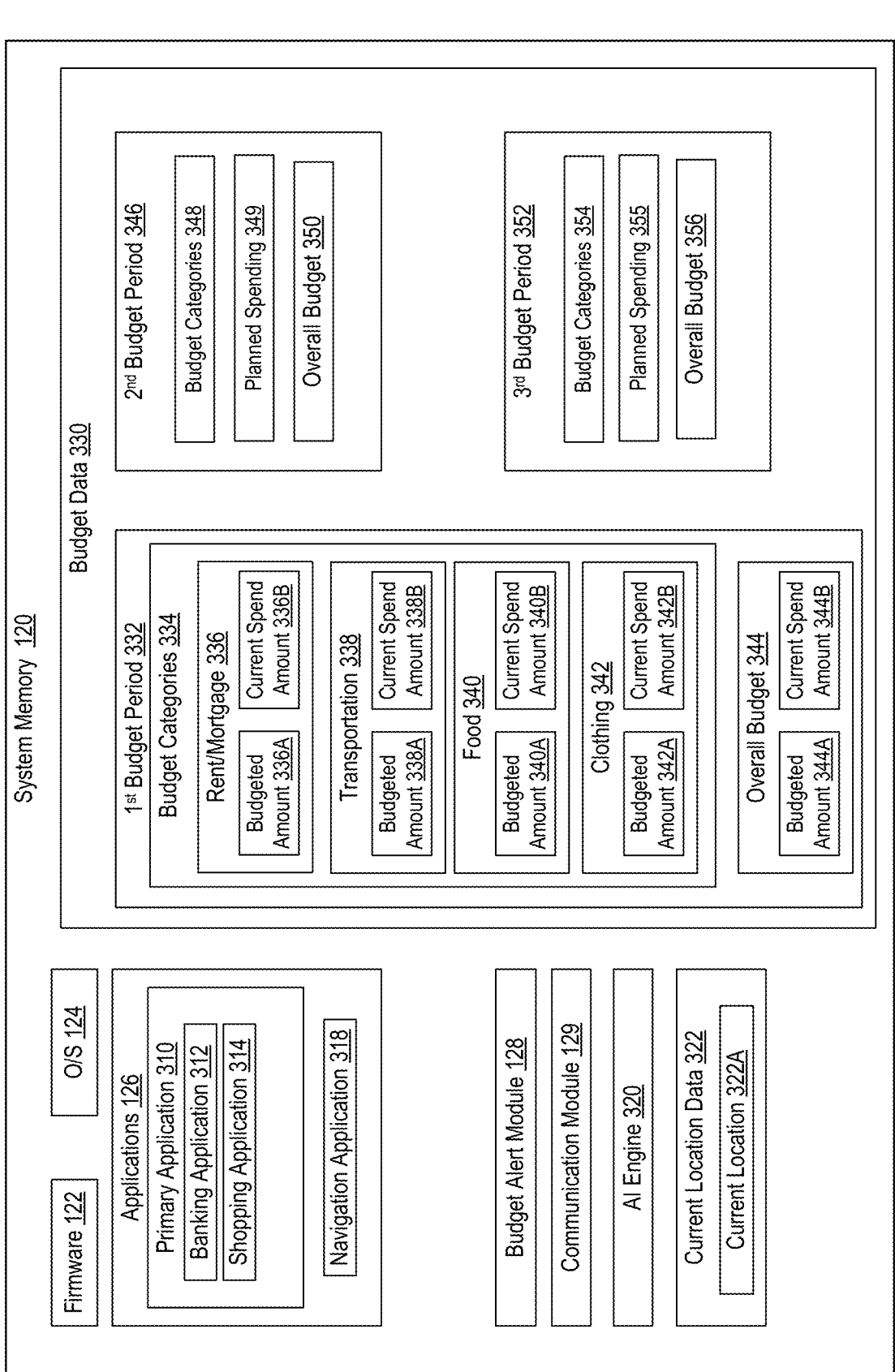

Referring to FIG. 3A, there is shown one embodiment of example contents of system memory 120 of electronic device 100 configured to complete the various processes described herein. System memory 120 includes data, software, and/or firmware modules, including firmware 122, an operating system (O/S) 124, applications 126, budget alert module 128, and communication module 129.

Applications 126 include a primary application 310. Primary application 310 is a single application that provides access to one or more other applications. In one embodiment, primary application 310 can improve a user experience by having a single point of access for multiple applications. Primary application 310 includes a banking application 312, and a shopping application 314. Banking application 312 includes program code that is executed by processor 102 to enable electronic device 100 to access banking services provided by a bank or other financial institution. Shopping application 314 includes program code that is executed by processor 102 to enable electronic device 100 to access websites to browse and buy products or services from a retailer or service provider. While primary application 310 was shown including two applications, primary application 310 can include more or fewer than two applications. Applications 126 further include a navigation application 318. Navigation application 318 includes program code that is executed by processor 102 to enable electronic device 100 to provide access to navigation, mapping and location services.

Budget alert module 128 includes program code that is executed by processor 102 to enable electronic device 100 to perform the various features of the present disclosure. In one or more embodiments, budget alert module 128 enables electronic device 100 to present a budget alert for at least one budget category in response to detecting an over-budget condition. In one or more embodiments, execution of budget alert module 128 by processor 102 configures electronic device 100 to perform the processes presented in the flowcharts of FIGS. 7A-7B and 8A-8B, as will be described below. Communication module 129 enables electronic device 100 to communicate and exchange data with wireless network 150 and/or WiFi router 196 and with other devices.

System memory 120 includes artificial intelligence (AI) engine 320 and current location data 322. AI engine 320 accelerates artificial intelligence, natural language processing (NLP), context evaluation (CE), and machine learning applications. Current location data 322 includes a Current location 322A. Current location 322A is the current location of electronic device 100 as determined by location sensor 160. Location sensor 160, such as a GPS module, can sense, detect, or receive the current location of electronic device 100.

System memory 120 includes budget data 330. Electronic device 100 can receive budget data 330 from application computer system 180. Budget data 330 can include a first budget period 332, second budget period 346, and third budget period 352. While three budget periods are shown, budget data 330 can include more or fewer budget periods. In one example embodiment, budget data 330 can include a budget period for each month of the year for twelve total budget periods. In one example, first budget period 332 can correspond to a personal budget for an individual for the month of June. In another example, first budget period 332 can correspond to a current budget period.

First budget period 332 includes budget categories 334 and overall budget 344. Second budget period 346 includes budget categories 348, planned spending 349, and overall budget 350. Third budget period 352 includes budget categories 354, planned spending 355, and overall budget 356. Planned spending 349 and planned spending 355 can include scheduled spending from the current budget period and any scheduled installment payments.

Example budget categories 334 include rent/mortgage 336, transportation 338, food 340, and clothing 342. Rent/mortgage 336 includes a budgeted amount 336A and a current spend amount 336B. The budgeted amount 336A is the amount planned or allocated for the budget period (i.e., month) to spend and the current spend amount 336B is the amount that has already been spent for the budget period for the budget category. Transportation 338 includes a budgeted amount 338A and a current spend amount 338B. Food 340 includes a budgeted amount 340A and a current spend amount 340B. Clothing 342 includes a budgeted amount 342A and a current spend amount 342B. Budget categories 334 can include more or fewer budget categories than the example budget categories described above. Budget categories 348 for the second budget period and budget categories 354 for the third budget period can each include the same respective budget categories (i.e., rent/mortgage, transportation, food, and clothing) as described for budget categories 334 and/or can further include additional categories that can be unique to the particular budget period. For example, a December budget can include a Christmas/Holiday gift category.

Overall budget 344 includes an overall budgeted amount 344A and an overall current spend amount 344B. The overall budgeted amount 336A is the total amount planned or allocated for the first budget period (i.e., month) to spend for all of the budget categories combined. The overall current spend amount 344B is the total amount that has been already spent for the first budget period for all of the budget categories combined or summed together. Similarly, overall budget 350 for the second budget period and overall budget categories 356 for the third budget period would each include respective overall budgeted amounts and overall current spend amounts.

Turning to FIG. 3B, there is shown additional details of example contents of system memory 120 of electronic device 100 configured to complete the various processes described herein. System memory 120 includes transaction data 360, current cost data 368, and historical data 374. Electronic device 100 can receive transaction data 360, current cost data 368, and historical data 374 from application computer system 180. Transaction data 360 includes data and information that corresponds to one or more transactions that are performed via electronic device 100 or other device associated with the same user and/or user budgeting account. Transaction data 360 can correspond to transaction data 240 received from application computer system 180. In an example embodiment, a transaction to purchase an item can be performed via electronic device 100 and shopping application 314, and completion of the transaction generates corresponding transaction data, including item description and cost, and location, store, or online retailer associated with the transaction. Example transaction data 360 includes a first transaction 361 and a second transaction 364. While transaction data 360 is shown for two transactions, transaction data 360 can include one transaction or more than two transactions.

First transaction 361 includes a first transaction type 362 and a first payment amount 363. First transaction type 361 identifies the kind of transaction being performed by electronic device 100. In an example embodiment, a transaction at a grocery store can be identified as a food purchase transaction type. First payment amount 363 is the amount of money or funds or credits (e.g., fungible currency) that is needed to complete the first transaction. Second transaction 364 includes a second transaction type 365 and a second payment amount 366.

Current cost data 368 includes data and information that corresponds to a current cost for an item from an online or physical retailer of the intended transaction. Current cost data 368 can correspond to current cost data 234 received from application computer system 180. Current cost data 368 includes first item 369 and second item 371. First item 369 includes a first current cost 370 for the first item. Second item 371 includes a second current cost 372 for the second item. While current cost data 368 is shown for two items, current cost data 368 can include the respective current cost for a single item or more two items.

Historical data 374 includes data and information that corresponds to known previous historical transactions for the same or a similar item as the intended transaction. In one embodiment, application computer system 180 can track transactions for an item over a period of time (e.g., 6 months) and generate corresponding historical data 236. Historical data 374 can correspond to historical data 236 received from application computer system 180. Historical data 374 includes first item historical data 375 and second item historical data 377. First item historical data 375 includes a first historical cost 376 for the first item. Second item historical data 377 includes a second historical cost 378 for the second item. While historical data 374 is shown for two items, historical data 374 can include the respective historical cost for a single item or more than two items.

System memory 120 further includes pre-identified merchant locations 380. Pre-identified merchant locations 380 are known physical locations where a merchant of goods or services are located. Example pre-identified merchant locations 380 include a first merchant location 382 and a second merchant location 386. First merchant location 382 includes a first merchant average spend amount 384 and transaction type 385. Second merchant location 386 includes a second merchant average spend amount 388 and transaction type 389. First merchant average spend amount 384 and second merchant average spend amount 388 are the amounts of money that are spent on average by a consumer when visiting the respective merchant. Transaction types 385 and 389 are the types of transactions that occur at the respective merchants. The first merchant average spend amount 384 and transaction type 385 and second merchant average spend amount 388 and transaction type 389 can be tracked over time by application computer system 180 and stored as part of historical data 236. The first merchant average spend amount 384 and transaction type 385, and second merchant average spend amount 388 and transaction type 389 can be received from application computer system 180 as part of received historical data 236.

System memory 120 includes scheduled payments 390. Scheduled payments 390 incudes installment payments 391 and scheduled transaction payments 396. In one embodiment, during a transaction, a user can select to complete the transaction via installment payments over several time periods. Installment payments 391 can include the installment payment amounts 392 and number of payments 394 for the future budget periods for the intended transaction. Scheduled transaction payments 396 are payments for saved later/scheduled transactions from previous budget periods.

Figure 4B:
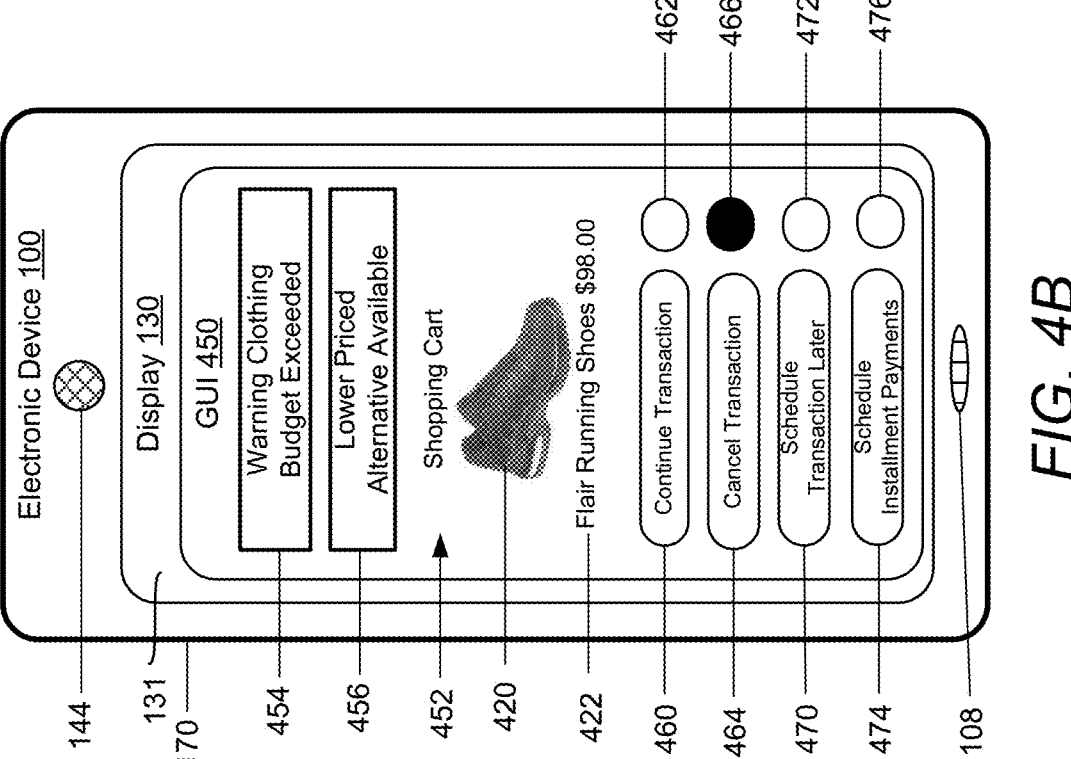
FIG. 4B is an example illustration of a display of an electronic device presenting a GUI that includes a product that has been selected for purchase and a budget alert indicating that purchasing the product will result in an over-budget condition, according to one or more embodiments.
Figure 4A:
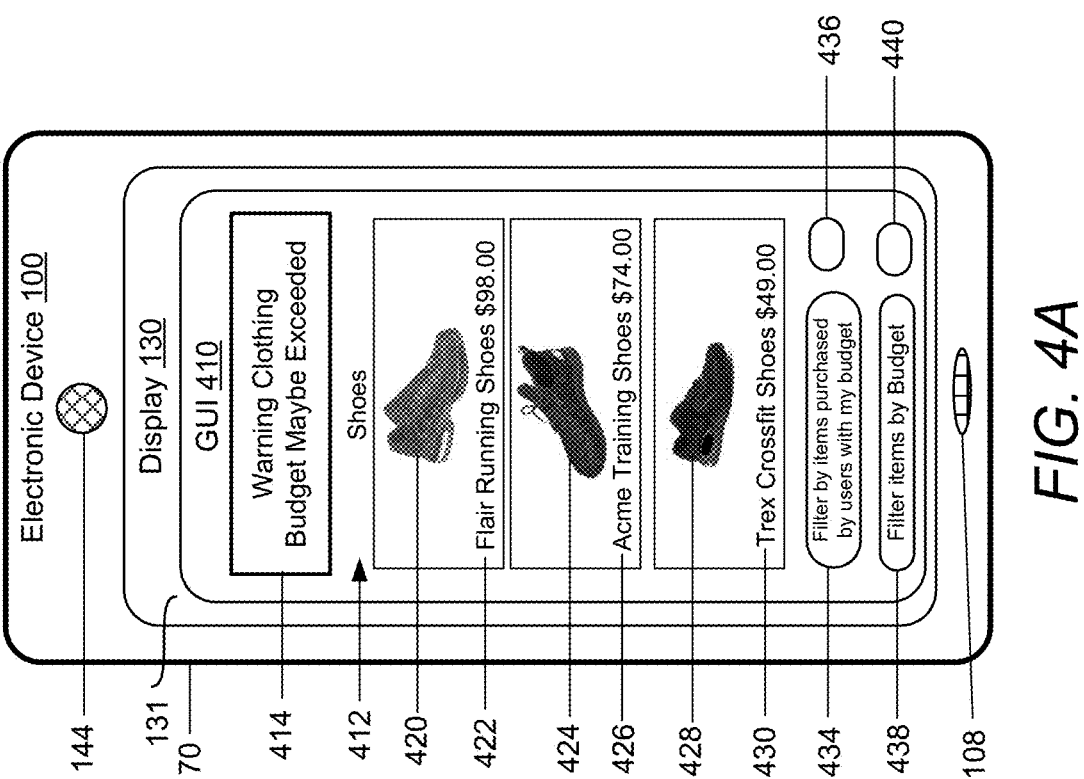
FIG. 4A is an example illustration of a display of an electronic device presenting a graphical user interface (GUI) that includes several products available for purchase and a budget alert indicating that purchasing one or more of the products shown will result in an over-budget condition, according to one or more embodiments.

With reference to FIG. 4A, electronic device 100 is shown with an example shopping graphical user interface (GUI) 410 presented on display 130. Shopping GUI 410 allows a user of electronic device 100 to purchase goods and services from a merchant. In one embodiment, electronic device 100 can access a shopping website using shopping application 314 executing on processor 102. Shopping GUI 410 includes a product category page 412 that includes several items or products that have been searched for by a user. In an example embodiment, product category page 412 can be shoes. Product category page 412 includes several different types of shoes 420, 424 and 428 and a respective product description and price 422, 426 and 430 for each of the shoes. Shopping website GUI 410 further includes a budget alert 414, which is a message or notification that the clothing budget for the current budget period (e.g., clothing budget amount 342A) maybe exceeded, depending upon which product (shoe) is selected for purchase.

In the example of FIG. 4A, the purchase of some products (e.g., shoes 420 or 424) would cause the clothing budget to be exceeded for the current budget period and the purchase of other products (e.g., shoes 428) would not cause the clothing budget to be exceeded for the current budget period. In another example, if all of the products shown on the product category page 412 would cause the clothing budget to be exceeded or if the clothing budget is already overrun, the budget alert 414 can state that the clothing budget category 342 for the current budget period is exceeded or overrun.

Shopping GUI 410 includes filter option 434, with option on/off indication 436. Shopping GUI 410 further includes filter items by budget option 438, with option on/off indication 440. When selected, filter option 434 enables electronic device 100 to only display items or products within product category page 412 that have been purchased by other users with a similar budget to the user of electronic device 100 (i.e., similar to budget data 330). In one embodiment, historical data 236 of shopping database 230 can include a list of similar items purchased by other users with similar budget profiles (i.e., similar to budget data 330) that can be accessed by electronic device 100. Option on/off indication 436 is filled in or checked when filter option 434 is selected.

When selected, filter option 438, enables electronic device 100 to only display items or products within product category page 412 that would not exceed the user's budget for the budget category and budget period (e.g., clothing budget amount 342A). Option on/off indication 440 is filled in or checked when filter option 438 for filtering items by available budget is selected.

According to one aspect of the disclosure, electronic device 100 can detect a trigger indicative of an intended transaction 361 that falls within a first budget category 334 having a budgeted amount for at least one first budget period 332. In response to detecting the trigger, electronic device 100 transmits, to a budget data repository 224, a request for budget data 330. The budget data 330 includes a corresponding first budget amount (e.g., clothing budget amount 342A) and first current spend amount (e.g., clothing current spend amount 342B) associated with the first budget category (e.g., clothing budget category 342) for the at least one budget period (e.g., first budget period 332). Electronic device 100 identifies an over-budget condition by determining that a first sum of a first transaction payment amount 363 for the intended transaction 361 and the first current spend amount (e.g., clothing current spend amount 342B) is greater than the first budget amount (e.g., clothing budget amount 342A). In response to identifying the over-budget condition, electronic device 100 presents a first budget alert 414 on the display 130. The first budget alert 414 indicates that the first budget amount (e.g., clothing budget amount 342A) will be exceeded if the intended transaction 361 is completed within the at least one budget period (e.g., first budget period 332).

According to another aspect of the disclosure, electronic device 100 can detect a trigger indicative of an intended transaction. In order to detect the trigger, electronic device 100 detects initiation of (i) at least one shopping application 314 or (ii) at least one payment. Electronic device 100 initiates processes resulting in presentation of the budget alert 414, in response to detecting initiation of either (i) at least one shopping application 314 or (ii) at least one payment, which is evaluated to potentially cause an over-budget condition. The budget alert 414 can also be presented in a different format such as an audio notification, a push notification, or via a text or email message.

With reference to FIG. 4B, electronic device 100 is shown with an example shopping graphical user interface (GUI) 450 presented on display 130. Shopping GUI 450 is shown with a shopping cart interface after a user has selected a product for purchase. Shopping GUI 450 includes a shopping cart page 452 that includes an item or product (e.g., shoes 420) that have been selected by a user for purchase. In the example of FIG. 4B, completion of the intended transaction to purchase shoes 420 would cause the clothing budget to be exceeded for the current budget period (e.g., clothing budget amount 342A). Shopping GUI 450 thus includes a budget alert 454 (i.e., a message or notification) that the clothing budget for the current budget period (e.g., clothing budget amount 342A) is exceeded or overrun if the intended transaction for shoes 420 in the shopping cart is completed. Shopping GUI 450 includes a notification 456 that a lower priced alternative to the intended transaction is available from other merchants. Notification 456 can include the merchant name with the lower priced alternative and the price of the lower priced alternative. In one embodiment, electronic device 100 can use historical data 236 to retrospectively recommend alternatives for transactions that would result in a budget overrun.

Shopping GUI 450 further includes continue transaction option 460, with option on/off indication 462, cancel transaction option 464, with option on/off indication 466, schedule transaction later option 470, with option on/off indication 472, and schedule installment payments option 474, with option on/off indication 476.

When selected, continue transaction option 460, enables electronic device 100 to complete the intended transaction (e.g., first transaction 361) with the selected item (e.g., shoes 420) in the shopping cart. Completion of the intended transaction will result in a budget overrun condition (e.g., clothing budget amount 342A exceeded). Option on/off indication 462 is filled in or checked when continue transaction option 460 is selected. When selected, cancel transaction option 464, enables electronic device 100 to cancel the intended transaction (e.g., first transaction 361). Cancellation of the intended transaction will result in the clothing budget amount 342A not being exceeded. Option on/off indication 466 is filled in or checked when cancel transaction option 464 is selected.

When selected, schedule transaction later option 470, enables electronic device 100 to schedule the intended transaction (e.g., first transaction 361) for a future time period (i.e., a future budget period). Option on/off indication 472 is filled in or checked when schedule transaction later option 470 is selected. When selected, schedule installment payments option 474, enables electronic device 100 to complete the intended transaction (e.g., first transaction 361) with payment via installment payments 391 over several future budget periods. The selection of schedule installment payments option 474 can enable electronic device 100 to calculate installment payments 391 for future budget periods such that the budgeted clothing amount 342A is not overrun or exceeded for the current budget period (e.g., first budget period 332) and is not overrun or exceeded for future budget periods. Option on/off indication 476 is filled in or checked when schedule installment payments option 474 is selected. In one or more embodiments, the scheduled installment payment is automatically added to the current spend amount of the associated budget category, as an expended costs, at the start of the billing period.

According to one aspect of the disclosure, electronic device 100 can present GUI 450 on display 130. GUI 450 includes budget alert 454 and a user-selectable option 460 to continue the intended transaction 361. In response to detecting selection of the user-selectable option 460, electronic device 100 triggers completion of the intended transaction 361. Electronic device 100 calculates a second current spend amount of the budget category by adding the first payment amount (e.g., first transaction payment amount 363) to the first current spend amount (e.g., first current spend amount 342B) and stores the second current spend amount to system memory 120.

According to another aspect of the disclosure, GUI 450 includes budget alert 454 and a user-selectable option 464 to cancel the intended transaction 361. In response to detecting selection of the user-selectable option 464 to cancel the intended transaction 361, electronic device 100 cancels the intended transaction 361.

According to an additional aspect of the disclosure, GUI 450 includes budget alert 454 and a user-selectable option 470 to schedule the intended transaction at a later time. In response to detecting selection of the user-selectable option 470 to schedule the intended transaction at a later time, electronic device 100 identifies a number of future budget periods, including second budget period 346 and schedules the intended transaction 361 for completion during a future budget period such as second budget period 346.

According to one more aspect of the disclosure, GUI 450 includes budget alert 454 and a user-selectable option 474 to schedule installment payments for the intended transaction. In response to detecting selection of user-selectable option 474 to schedule installment payments for the intended transaction, electronic device 100 calculates installment payment amounts 392 for a plurality of future budget periods (i.e., second budget period 346, third budget period 352, and other future budget periods) for the intended transaction 361. Electronic device 100 determines if the installment payment amounts 392 for the plurality of future budget periods for the intended transaction 361 are less than corresponding budgeted amounts for the future budget periods. In response to determining that the respective installment payment amounts 392 for the plurality of future budget periods for the intended transaction are less than each corresponding budgeted amounts for the future budget periods, electronic device 100 schedules the installment payments 391 during the plurality of future budget periods, and triggers completion of the intended transaction 361 via installment payments during the plurality of future budget periods.

According to another additional aspect of the disclosure, electronic device 100 can identify a payment amount for the intended transaction (e.g., first transaction payment amount 363) by the electronic device completing at least one of (i) retrieving historical data 374 for purchase of a similar item as the intended transaction, (ii) accessing a current cost listing or data 368 for the intended transaction from an online retailer of the intended transaction, and (iii) identifying a lower priced alternative for the intended transaction, and present a notification 456 that lower priced alternatives for the intended transaction are available.

Figure 5B:
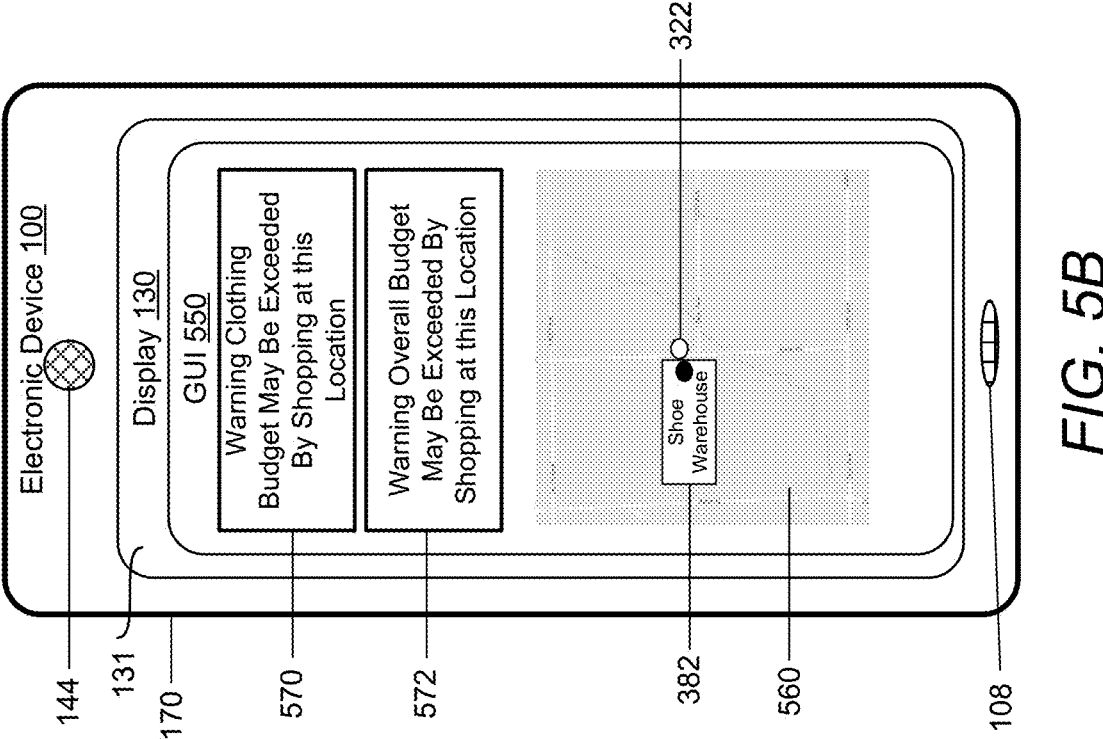
FIG. 5B is an example illustration of a display of an electronic device presenting a GUI that includes a location-based budget alert, according to one or more embodiments.
Figure 5A:
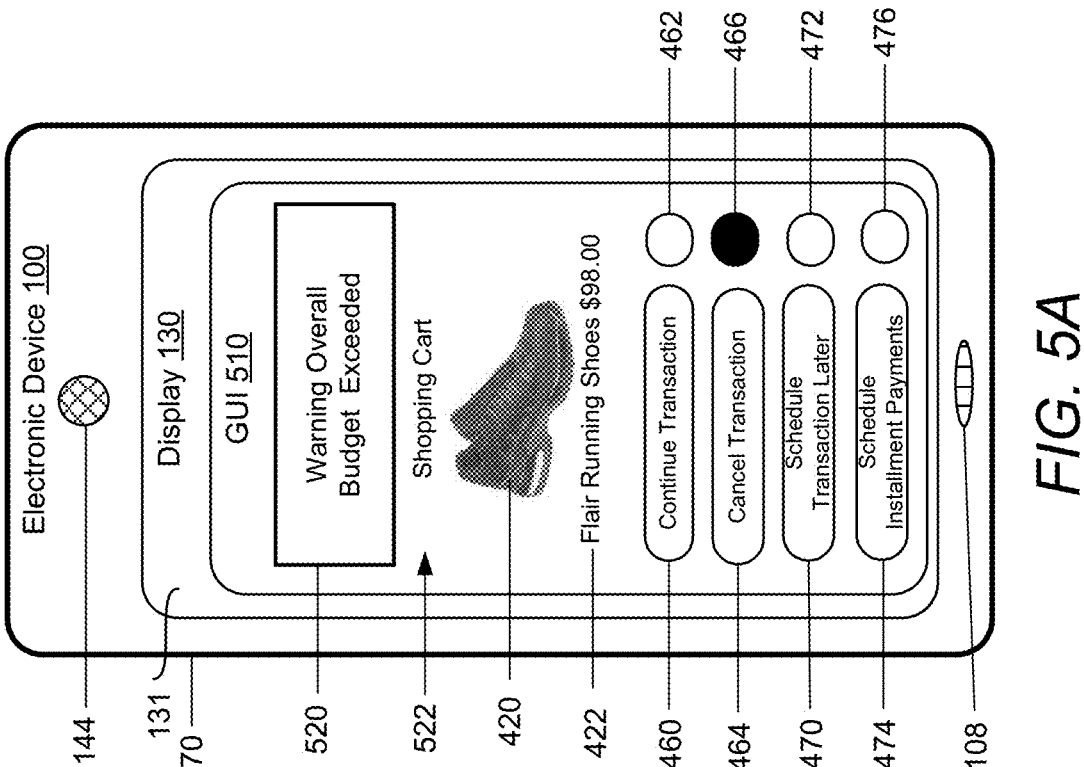
FIG. 5A is an example illustration of a display of an electronic device presenting a GUI that includes a product that has been selected for purchase and a budget alert indicating that purchasing the product will result in an overall budget being exceeded for a budget period, according to one or more embodiments.

With reference to FIG. 5A, electronic device 100 is shown with an example shopping graphical user interface (GUI) 510 presented on display 130. Shopping GUI 510 is shown with a shopping cart interface after a user has selected a product for purchase. Shopping GUI 510 includes shopping cart page 522 that includes an item or product (e.g., shoes 420) that have been selected by a user for purchase. Shopping GUI 510 includes an overall budget alert 520 that the overall budget for the current budget period (e.g., overall budget amount 344A) will be exceeded or overrun if the intended transaction for the product (e.g., shoes 420) in the shopping cart is completed.

In the example of FIG. 5A, completion of the intended transaction to purchase shoes 420 would cause the overall budget for the current budget period (e.g., overall budgeted amount 344A) to be exceeded. Shopping GUI 510 includes the same selectable options as previously described for shopping GUI 450 of FIG. 4B. Shopping GUI 510 includes continue transaction option 460, with option on/off indication 462, cancel transaction option 464, with option on/off indication 466, schedule transaction later option 470, with option on/off indication 472, and schedule installment payments option 474, with option on/off indication 476. In one embodiment, overall budget alert 520 can be presented in addition to budget alert 414 of FIG. 4A or can be presented in addition to budget alert 454 of FIG. 4B when the overall budget is determined to be exceeded during an intended transaction.

According to one aspect of the disclosure, in response to transmitting a request 260 for budget data from the budget tracking repository 224, electronic device 100 receives budget data 330 for a plurality of budget categories 334, with corresponding budget amounts and current spend amounts for each of the plurality of budget categories 334 for the at least one budget period (e.g., first budget period 332). Electronic device 100 sums or combines budget amounts (e.g., 336A, 338A, 340A, and 342A) for each of the plurality of budget categories to provide an overall budget amount 344A for the budget period. Electronic device 100 sums or combines current spend amounts (e.g., 336B, 338B, 340B, and 342B) for each of the plurality of budget categories to provide an overall current spend amount 344B for the budget period. Electronic device 100 determines if a second sum of the first payment amount (e.g., first transaction payment amount 363) and the overall current spend amount 344B is greater than the overall budget amount 344A for the budget period. In response to determining the second sum is greater than the overall budget amount 344A for the budget period, electronic device 100 initiates presentation of budget alert 520 on display 130. Budget alert 520 indicates that the overall budget amount 344A will be exceeded if the intended transaction is completed within the at least one budget period.

Turning to FIG. 5B, electronic device 100 is shown with an example location-based budget alert graphical user interface (GUI) 550 presented on display 130. Location-based budget alert GUI 550 includes a map 560. Map 560 can show the current location 322A of electronic device 100. Map 560 includes a pre-identified merchant location (e.g., first merchant location 382) with the name of the merchant (e.g., shoe warehouse). Location-based budget alert GUI 550 includes a budget alert 570 and an overall budget alert 572. Budget alert 570 can indicate that electronic device 100 is at a pre-identified merchant location where the purchase of goods or services may cause a budget overrun condition or a budget to be exceeded for at least one budget category. Overall budget alert 572 can indicate that electronic device 100 is at a pre-identified merchant location where the purchase of goods or services may cause a budget overrun condition for an overall budget.

According to one aspect of the disclosure, electronic device 100 can detect a trigger that is indicative of an intended transaction. The trigger can be movement of electronic device 100 towards or into a pre-identified merchant location (e.g., first merchant location 382). To detect the trigger, electronic device 100 monitors, via location sensor 160, for changes in a current location 322A of the electronic device. Electronic device 100 determines, in part via current location data 322 received from location sensor 160, if the electronic device has moved to the pre-identified merchant location (e.g., first merchant location 382). In response to determining that electronic device 100 has moved to the pre-identified merchant location (i.e., first merchant location

382), electronic device 100 initiates processing to determine whether the intended transaction, at the pre-identified merchant location, causes an over-budget condition that results in presentation of budget alert 570 and/or overall budget alert 572.

According to another aspect of the disclosure, in response to determining the electronic device has moved to the pre-identified merchant location (e.g., first merchant location 382), electronic device 100 retrieves a first average spend amount 384 associated with previous transactions at the pre-identified merchant location. The previous transactions at the pre-identified merchant location can be used to identify the corresponding budget category. Electronic device 100 determines if the first average spend amount 384, when added to the first current spend amount (e.g., current spend amount 342B) is greater than the first budget amount (e.g., budgeted amount 342A). In response to determining that the first average spend amount 384, when added to the first current spending amount (e.g., current spend amount 342B), is greater than the first budget amount (e.g., budgeted amount 342A), electronic device 100 presents budget alert 570 on display 130. The budget alert 570 indicates that electronic device 100 is at the pre-identified merchant location (e.g., first merchant location 382), where the first budget amount for the budget category may be exceeded based on historical spending at that location.

Figure 6B:
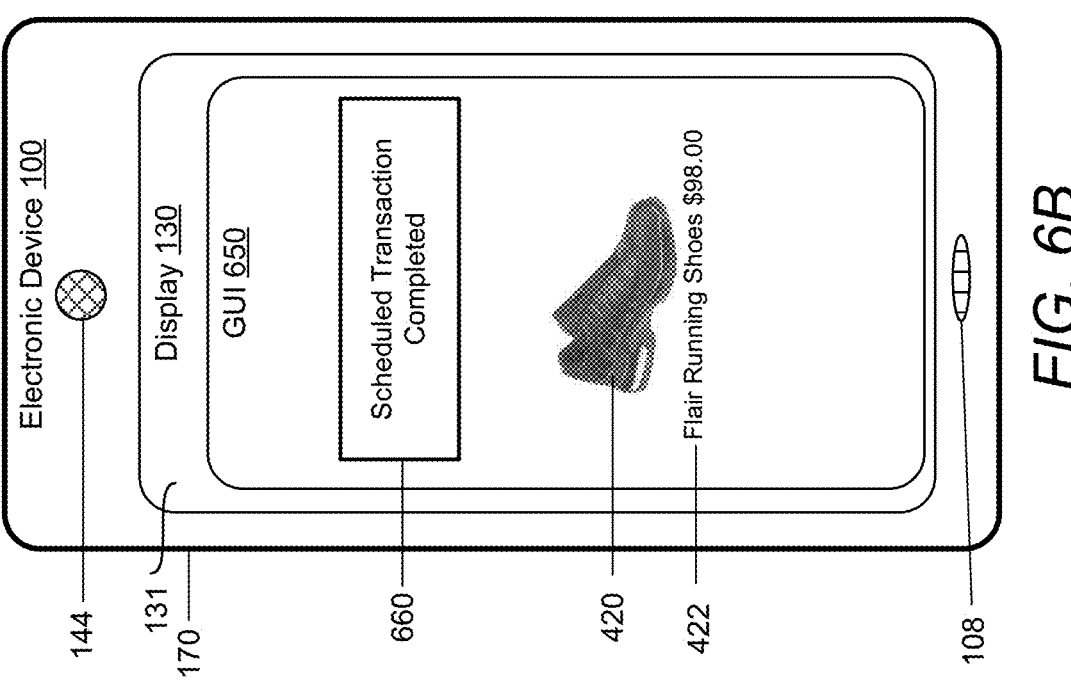
FIG. 6B is an example illustration of a display of an electronic device presenting a GUI that includes a notification that an intended transaction has been completed, according to one or more embodiments.
Figure 6A:
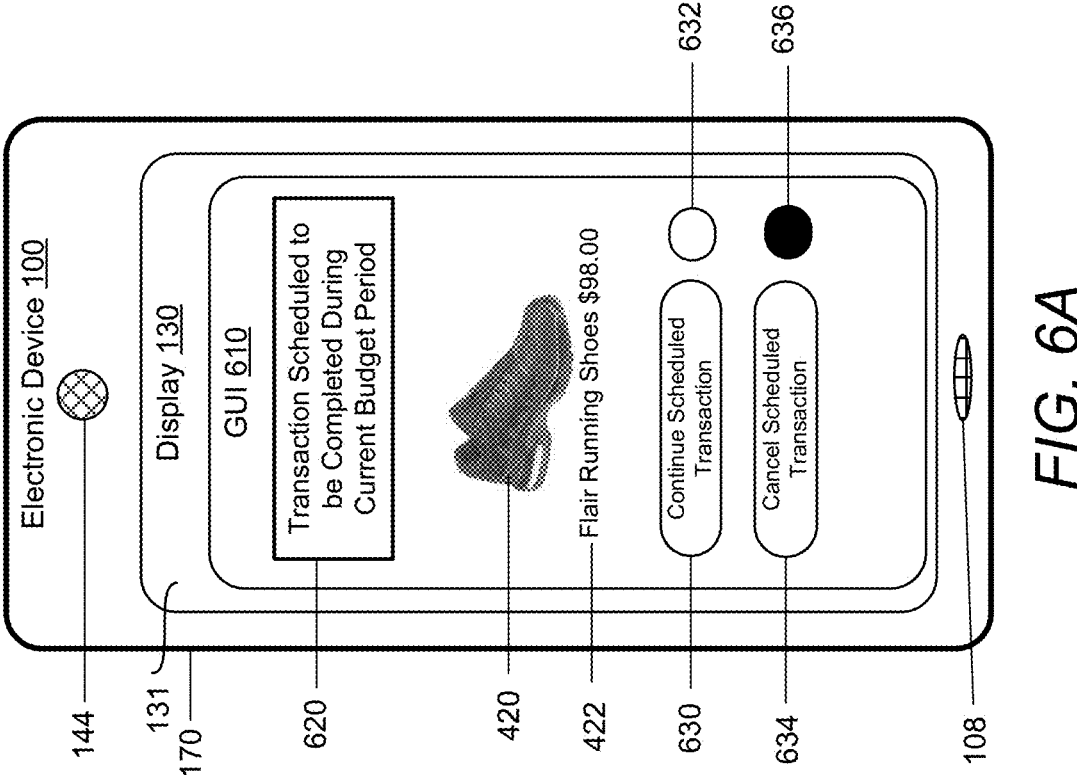
FIG. 6A is an example illustration of a display of an electronic device presenting a GUI that includes a notification that an intended transaction has been scheduled for completion during the current budget period, according to one or more embodiments.

Referring to FIG. 6A, electronic device 100 is shown with an example graphical user interface (GUI) 610 presented on display 130. GUI 610 includes a notification 620 that a previously scheduled transaction will be completed during the current budget period (e.g., second budget period 346). The previously scheduled transaction was scheduled for completion during a prior budget period (e.g., first budget period 332). In one embodiment, electronic device 100 can also determine that scheduled transaction will not result in an over-budget condition at the current time.

GUI 610 further includes a continue scheduled transaction option 630, with option on/off indication 632, and cancel scheduled transaction option 634, with option on/off indication 636. Option on/off indication 632 is filled in or checked when continue scheduled transaction option 630 is selected. When selected, continue scheduled transaction option 630 enables electronic device 100 to complete the intended transaction (e.g., first transaction 361) during the current budget period. When selected, cancel scheduled transaction option 634, enables electronic device 100 to cancel the intended transaction (e.g., first transaction 361) during the current budget period. Option on/off indication 636 is filled in or checked when cancel scheduled transaction option 634 is selected.

According to one aspect of the disclosure, electronic device 100 can determine if a current budget period (e.g., second budget period 346) corresponds to a budget period with a scheduled intended transaction. In response to determining that the current budget period corresponds to a budget period with a scheduled intended transaction, electronic device 100 presents GUI 610 including notification 620 that the intended transaction is scheduled to be completed in the current budget period and including option 630 for either completing the intended transaction or not completing the intended transaction option 634 during the current budget period.

Referring to FIG. 6B, electronic device 100 is shown with an example graphical user interface (GUI) 650 presented on display 130. GUI 650 includes a notification 660 that the previously scheduled transaction was completed during the current budget period (e.g., second budget period 346). The previously scheduled transaction was scheduled for completion during a prior budget period (e.g., first budget period 332).

According to one aspect of the disclosure, electronic device 100 can determine if a current budget period (e.g., second budget period 346) corresponds to a budget period with a scheduled intended transaction. In response to determining that the current budget period corresponds to a budget period with a scheduled intended transaction, electronic device 100 executes the scheduled intended transaction and presents GUI 650 including notification 660 that the scheduled intended transaction was completed.

Figure 7B:
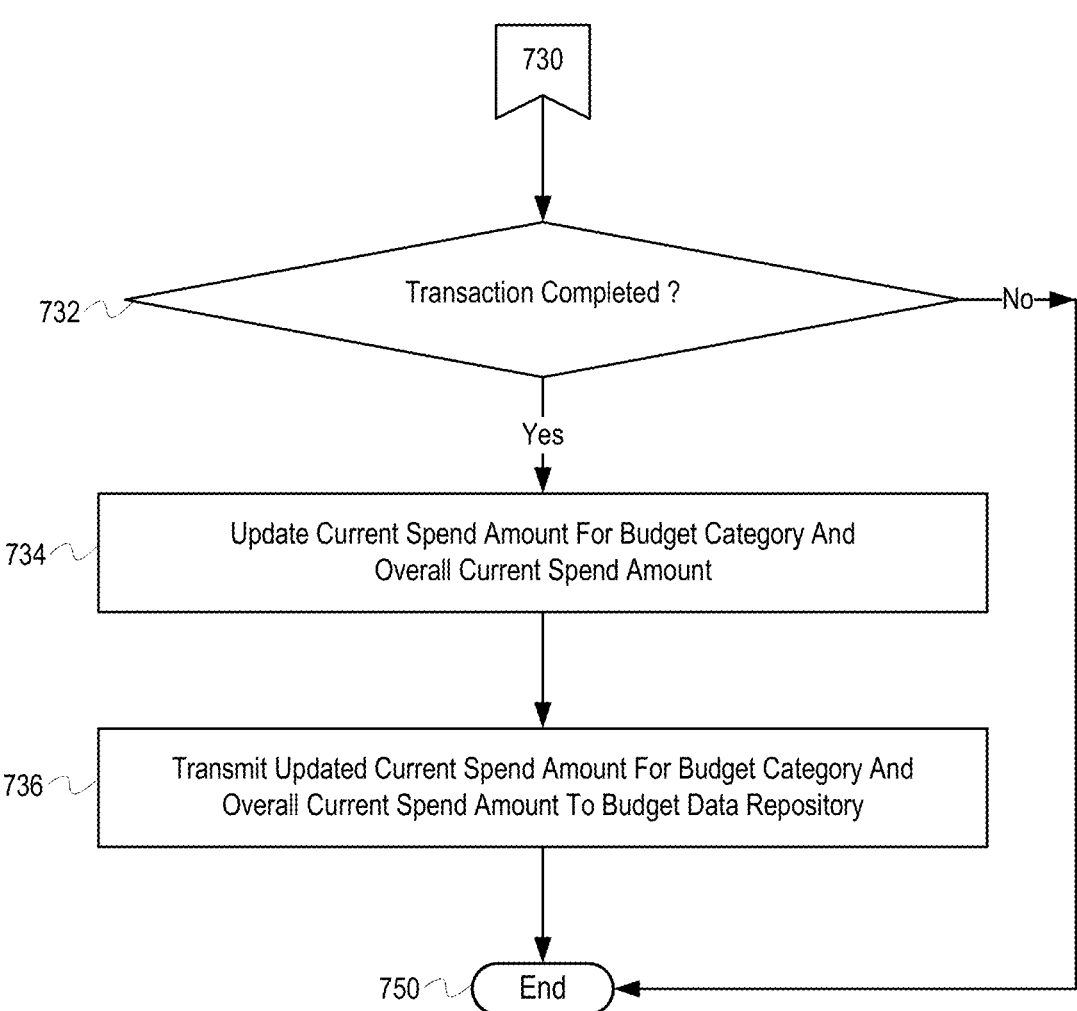
Figure 8A:
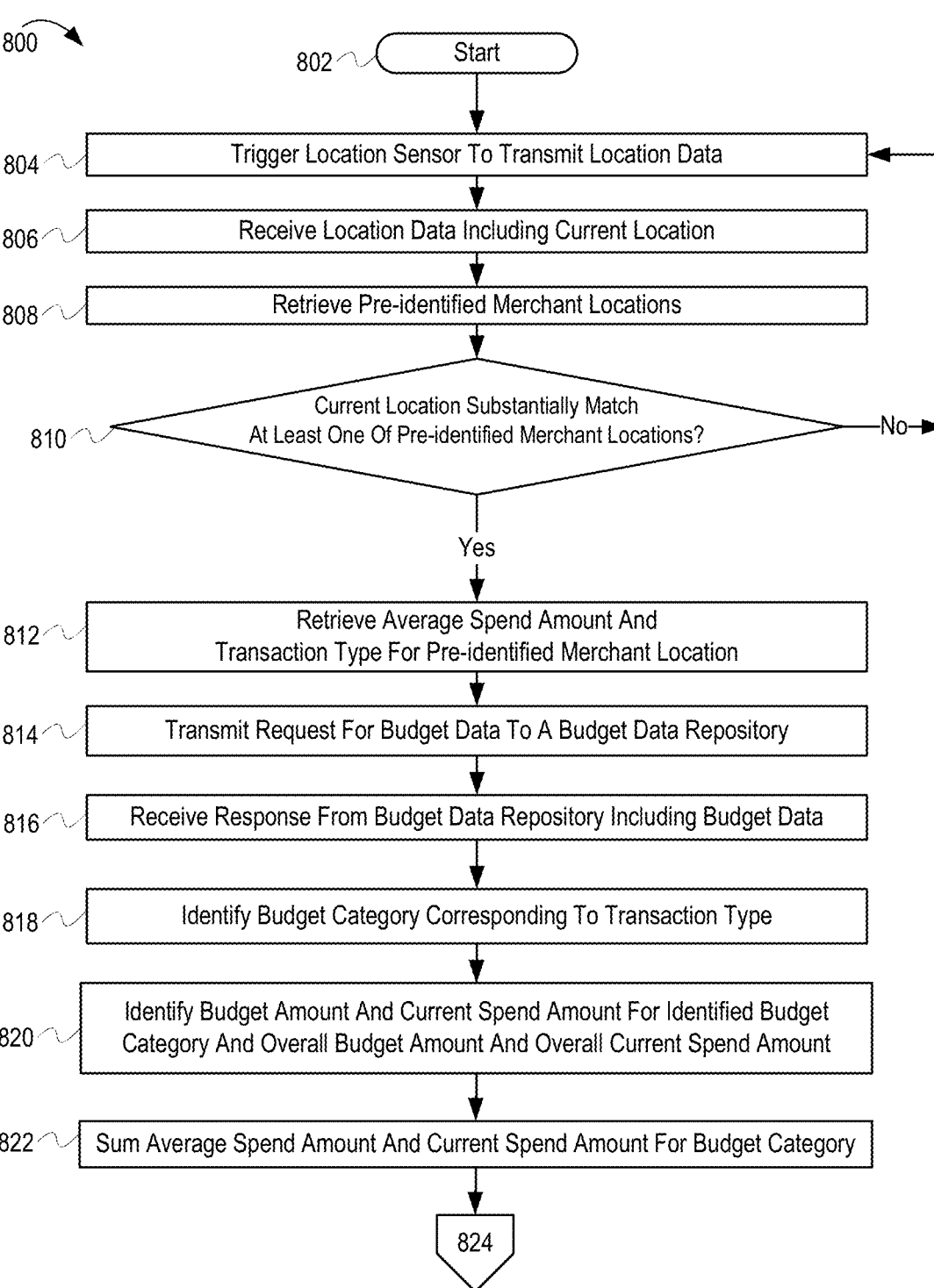

FIGS. 7A-7B depicts method 700 by which electronic device 100 identifies an over-budget condition and presents a budget alert for at least one budget category. FIGS. 8A-8B depicts method 800 by which electronic device 100 identifies that the electronic device is at a pre-identified merchant location where an over-budget condition can occur and presents a location-based budget alert. The description of methods 700 and 800 will be described with reference to the components and examples of FIGS. 1-6B. The operations depicted in FIGS. 7A-7B and 8A-8B can be performed by electronic device 100 or any suitable electronic device that includes the one or more functional components of electronic device 100 that provide/enable the described features. One or more of the processes of the methods described in FIGS. 7A-7B and 8A-8B may be performed by processor 102 executing program code associated with budget alert module 128.

With specific reference to FIG. 7A method 700 begins at the start block 702. At block 704, method 700 includes detecting a trigger that is indicative of an intended transaction (e.g., first transaction 361). In one embodiment, the trigger can be the initiation of at least one shopping application 314 or initiation at least one payment. Method 700 includes transmitting a request 260 for budget data 226 to budget tracking repository 224 (block 706) and transmitting a request 260 for transaction data 240 to transaction data repository 238 (block 708). Method 700 includes receiving a response 262 from budget tracking repository 224 including the budget data 226 (block 710) and receiving a response 262 from transaction data repository 238 including the transaction data 240 (block 712).

Method 700 includes identifying a transaction type (e.g., first transaction type 362 for shoes 420) and transaction payment amount (e.g., first transaction payment amount 363) for an intended transaction (e.g., first transaction 361) based on the transaction data (block 714). Method 700 includes identifying, from among the budget categories 334, the budget category (e.g., budget category 342 "clothing") corresponding to the transaction type (e.g., first transaction type 362) (block 716). Method 700 includes identifying a budget amount 342A and current spend amount 342B for the identified budget category (e.g., budget category 342 "clothing") and identifying an overall budget amount 344A and current spend amount 344B for the current budget period (e.g., first budget period 332) (block 718).

Method 700 includes summing the transaction payment amount (e.g., first transaction payment amount 363) and the current spend amount (e.g., clothing current spend amount 342B) for the identified budget category and current time period (block 720). At decision block 722, method 700 determines if the sum of the transaction payment amount (e.g., first transaction payment amount 363) and the current spend amount (e.g., clothing current spend amount 342B) is greater than the budget amount (e.g., clothing budget amount 342A). In one embodiment, if the clothing budget amount 342A is already overrun or exceeded, block 720 can be omitted. In such an instance, method 700 can proceed from block 718 to an alternate version of block 724 where a budget alert is presented indicating the budget has already been exceeded. The amount by which the budget has been exceeded can also be presented with the budget alert GUI so the user can be more fully/completely informed.

Returning to decision block 722, in response to determining that the sum of the transaction payment amount (e.g., first transaction payment amount 363) and the current spend amount (e.g., clothing current spend amount 342B) is greater than the budget amount (e.g., clothing budget amount 342A), method 700 includes presenting a first budget alert 414 (block 724) on the display 130. The first budget alert 414 indicates that the first budget amount (e.g., clothing budget amount 342A) will be overrun or exceeded for the budget category if the intended transaction 361 is completed within the at least one budget period (e.g., first budget period 332). A budget overrun or a transaction resulting in exceeding a budget can also be referred to as an over-budget condition. In one or more embodiments, the amount by which the budget will been exceeded can also be presented with the budget alert GUI so the user can be more fully/completely informed.

In response to determining that the sum of the transaction payment amount (e.g., first transaction payment amount 363) and the current spend amount (e.g., clothing current spend amount 342B) is not greater than the budget amount (e.g., clothing budget amount 342A) and after block 724, method 700 includes summing the transaction payment amount (e.g., first transaction payment amount 363) and the overall current spend amount (e.g., overall current spend amount 344B) for the current time period (block 726). At decision block 728, method 700 determines if the sum of the transaction payment amount (e.g., first transaction payment amount 363) and the overall current spend amount 344B is greater than the overall budget amount 344A for the current time period. In one embodiment, if the overall budget amount 344A for the current time period is already overrun or exceeded, block 720 can be omitted. In such an instance, method 700 can proceed from block 718 to an alternate version of block 730 where a budget alert is presented indicating the overall budget amount 344A for the current time period has already been exceeded.

In response to determining that the sum of the transaction payment amount (e.g., first transaction payment amount 363) and the overall current spend amount 344B is greater than the overall budget amount 344A for the current time period, method 700 includes presenting a second budget alert 520 on the display 130 (block 730). The second budget alert 520 indicates that the overall budget amount 344B will be overrun or exceeded for the budget category if the intended transaction 361 is completed within the at least one budget period (e.g., first budget period 332).

Turning to FIG. 7B, after block 730 and in response to determining that the sum of the transaction payment amount (e.g., first transaction payment amount 363) and the overall current spend amount 344B is not greater than the overall budget amount 344A for the current time period, (decision block 728), method 700 includes determining if the transaction (e.g., first transaction 361) has been completed (decision block 732). In response to determining that the transaction has not been completed, method 700 ends at end block 750.

In response to determining that the transaction has been completed, method 700 includes updating the current spend amount (e.g., clothing current spend amount 342B) for the budget category with the transaction payment amount (e.g., first transaction payment amount 363) and updating the overall current spend amount (e.g., overall current spend amount 344B) with the with the transaction payment amount (e.g., first transaction payment amount 363) (block 734). Method 700 includes transmitting the current spend amount for the budget category and the overall current spend amount to budget data repository 224 (block 736). Method 700 terminates at end block 750.

FIGS. 8A-8B illustrates method 800 by which electronic device 100 identifies that the electronic device is at a pre-identified merchant location where an over-budget condition can occur and presents a predictive location-based budget alert. With specific reference to FIG. 8A, method 800 begins at the start block 802. Method 800 includes triggering location sensor 160 to provide current location data 322 including current location 322A (block 804) and receiving the current location data 322 (block 806). Method 800 includes retrieving pre-identified merchant locations 380 from system memory 120 (block 808). Method 800 includes determining if the current location 322A of electronic device 100 substantially matches at least one of the pre-identified merchant locations 380 (decision block 810).

In response to determining that the current location 322A of electronic device 100 does not substantially match at least one of the pre-identified merchant locations 380, method 800 returns to block 804 to continue monitoring for whether current location data 322 substantially matches at least one of the pre-identified merchant locations 380 (i.e., performing the processes of blocks 804-810).

In response to determining that the current location data 322 of electronic device 100 substantially matches at least one of the pre-identified merchant locations 380, (e.g., first merchant location 382), method 800 includes retrieving an average spend amount 384 and transaction type 385 associated with previous transactions at the pre-identified first merchant location 382 (block 812).

Method 800 includes transmitting a request 260 for budget data 226 to budget tracking repository 224 (block 814) and receiving a response 262 from budget tracking repository 224 including the budget data 226 (block 816). In one embodiment, the received budget data can be stored as budget data 330 to system memory 120. Method 800 includes identifying, from among the budget categories 334, the budget category (e.g., budget category 342 "clothing") corresponding to the transaction type (e.g., first transaction type 385) (block 818). Method 800 includes identifying a budget amount 342A and current spend amount 342B for the identified budget category (e.g., budget category 342 "clothing") and identifying an overall budget amount 344A and current spend amount 344B for the current budget period (e.g., first budget period 332) from the received budget data (block 820). Method 800 includes summing the average spend amount 384 at the merchant location and the current spend amount (e.g., clothing current spend amount 342B) for the identified budget category and current time period (block 822).

Turning to FIG. 8B, method 800 includes determining at decision block 824 if the sum of the average spend amount 384 at the merchant location and the current spend amount (e.g., clothing current spend amount 342B) is greater than the budget amount (e.g., clothing budget amount 342A). In response to determining that the sum of the average spend amount 384 and the current spend amount (e.g., clothing current spend amount 342B) is greater than the budget amount (e.g., clothing budget amount 342A), method 800 includes presenting budget alert 570 on display 130 (block

826). The budget alert 570 indicates that electronic device 100 is at a pre-identified merchant location (e.g., first merchant location 382), where the budget amount for the budget category may be exceeded by shopping at first merchant location. In one embodiment, the budget alert GUI may also include an indication of an amount remaining to spend in the particular budget category or an amount already expended in the budget category.

In response to determining that the sum of the average spend amount 384 and the current spend amount (e.g., clothing current spend amount 342B) is not greater than the budget amount (e.g., clothing budget amount 342A), and after block 826, method 800 includes summing the average spend amount 384 at the merchant location and the overall current spend amount (e.g., overall current spend amount 344B) for the current time period (block 828). At decision block 830, method 800 determines if the sum of the average spend amount 384 and the overall current spend amount (e.g., overall current spend amount 344B) is greater than the overall budget amount 344A for the current time period.

In response to determining that the sum of the average spend amount 384 and the overall current spend amount 344B is not greater than the overall budget amount 344A for the current time period, method 800 ends at end block 850. In response to determining that the sum of the average spend amount 384 and the overall current spend amount 344B is greater than the overall budget amount 344A for the current time period, method 800 includes presenting a second budget alert 572 (block 832) on display 130. The second budget alert 572 indicates that electronic device 100 is at a pre-identified merchant location (e.g., first merchant location 382), where the overall budget amount may be exceeded by shopping at the first merchant location. Method 800 terminates at end block 850. Additionally, in another embodiment when the average spend levels 384 or merchant transaction type 385 at the predetermined first merchant location 382 is not available, method 800 can also include the presentation of a potential over-budget alert based only on the current spend amount for given transaction type 342A or overall spend amount 344A, where the current and/or overall spend amounts are already over the respective budgeted amounts or are close to the budgeted amounts.

In the above-described methods of FIGS. 7A-7B and 8A-8B, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. An electronic device comprising:

a display;

a communication system by which the electronic device communicates, via a communication network, with one or more application computer systems;

a location sensor which senses a current location of the electronic device;

a memory having stored thereon a budget alert (BA) module for presenting budget alerts for at least one budget category, and applications comprising a banking application for accessing a banking application database; and at least one processor communicatively coupled to the display, the communication system, the location sensor, and the memory, the at least one processor executing program code of the budget alert module, which configures the electronic device to:

detect a trigger indicative of an intended transaction that falls within a first budget category having a budgeted amount for at least one budget period, wherein the trigger comprises movement of the electronic device to a pre-identified transaction location among stored pre-identified transaction locations, and to detect the trigger, the at least one processor: monitors, via the location sensor, for changes in a current location of the electronic device; determines, in part via current location data received from the location sensor, location services of a navigation application, and the stored pre-identified transaction locations, if the electronic device has moved to the pre-identified transaction location;

in response to detecting the trigger, transmit, by the communication system over the communication network to a budget tracking repository, a request for budget data, the budget data including a corresponding first budget amount and first current spend amount associated with the first budget category for the at least one budget period, the budget tracking repository accessible, via the banking application of the electronic device, over the communication network;

receive, in response to the request for budget data, the budget data via the communication network from the budget tracking repository;

transmit, by the communication system over the communication network to a transaction data repository accessible via the communication network and different from the budget tracking repository, a request for transaction data associated with the intended transaction;

receive, in response to the request for transaction data, the transaction data from the transaction data repository via the communication network;

identify, by execution of the BA module, an over-budget condition by determining that a first sum of a first payment amount for the intended transaction and the first current spend amount is greater than the first budget amount; and in response to identifying the over-budget condition, present a first budget alert on the display, the first budget alert indicating that the first budget amount will be exceeded if the intended transaction is completed within the at least one budget period.

2. The electronic device of claim 1, wherein the processor further enables the electronic device to:

identify the first payment amount for the intended transaction, by enabling the electronic device to:

access a current cost listing for the intended transaction from an online retailer of the intended transaction; and identify lower priced alternatives for the intended transaction and present a notification that lower priced alternatives for the intended transaction are available.

3. The electronic device of claim 1, wherein to detect the trigger, the at least one processor:

detects initiation of at least one shopping application; and initiates processes resulting in presentation of the first budget alert on the display, in response to detecting initiation of the at least one shopping.

4. The electronic device of claim 1, wherein the at least one processor:

identifies a first transaction type and the first payment amount for the intended transaction based on the transaction data; and identifies, from among a plurality of budget categories, the first budget category corresponding to the first transaction type.

5. The electronic device of claim 1, wherein the at least one processor:

in response to determining the electronic device has moved to the pre-identified merchant location, initiates processing to determine whether the intended transaction, at the pre-identified merchant location, causes an over-budget condition that results in presentation of the first budget alert.

6. The electronic device of claim 5, wherein the at least one processor:

in response to determining the electronic device has moved to the pre-identified merchant location, retrieves a first average spend amount associated with previous transactions at the pre-identified merchant location;

determines if the first average spend amount, when added to the first current spend amount, is greater than the first budget amount; and in response to determining that the first average spend amount, when added to the first current spending amount, is greater than the first budget amount, presents a second budget alert on the display, the second budget alert indicating that the electronic device is at the pre-identified merchant location where the first budget amount may be exceeded.

7. The electronic device of claim 1, wherein the at least one processor:

in response to transmitting the request for budget data, receives, from the budget tracking repository over the network, budget data of a plurality of budget categories including the first budget category, with corresponding budget amounts and current spend amounts for each of the plurality of budget categories for the at least one budget period;

combines budget amounts for each of the plurality of budget categories to provide an overall budget amount;

combines current spend amounts for each of the plurality of budget categories to provide an overall current spend amount;

determines if a second sum of the first payment amount and the overall current spend amount is greater than the overall budget amount; and in response to determining the second sum is greater than the overall budget amount, initiates presentation of a second budget alert on the display, the second budget alert indicating that the overall budget amount will be exceeded if the intended transaction is completed within the at least one budget period.

8. The electronic device of claim 1, wherein the at least one processor:

presents a first graphical user interface (GUI) on the display, the first GUI including the first budget alert and a first user-selectable option to cancel the first intended transaction; and in response to detecting selection of the first user-selectable option, cancels the first intended transaction.

9. The electronic device of claim 1, wherein the at least one processor:

presents a first graphical user interface (GUI) on the display, the first GUI including the first budget alert and a second user-selectable option to continue the intended transaction; and in response to detecting selection of the second user-selectable option:

triggers completion of the intended transaction;

calculates a second current spend amount of the first budget category by adding the first payment amount to the first current spend amount; and stores the second current spend amount.

10. The electronic device of claim 1, wherein the at least one processor:

presents a first graphical user interface (GUI) on the display, the first GUI including the first budget alert and a third user-selectable option to schedule the intended transaction at a later time; and in response to detecting selection of the third user-selectable option, identifies a second budget period and schedules the intended transaction for completion during the second budget period.

11. The electronic device of claim 10, wherein the at least one processor:

determines if a current budget period corresponds to the second budget period; and in response to determining that the current budget period corresponds to the second budget period, automatically completes one of:

(i) execution of the scheduled intended transaction, with a notification that the scheduled intended transaction was completed; or (ii) presentation of a second user interface including a notification that the intended transaction was scheduled to be completed in the second budget period, which is the current budget period, and a selectable option for completing the intended transaction or not completing the intended transaction during the second budget period.

12. The electronic device of claim 1, wherein the at least one processor:

presents a first graphical user interface (GUI) on the display, the first GUI including the first budget alert and a fourth user-selectable option to schedule installment payments for the intended transaction;

in response to detecting selection of the fourth user-selectable option, calculates installment payment amounts for a plurality of future budget periods for the intended transaction;

determines if the installment payment amounts for the plurality of future budget periods for the intended transaction are less than corresponding budgeted amounts for the future budget periods;

in response to determining that the installment payment amounts for the plurality of future budget periods for the intended transaction are less than corresponding budgeted amounts for the future budget periods, schedules the installment payments during the plurality of future budget periods; and triggers completion of the intended transaction via installment payments during the plurality of future budget periods.

13. A method comprising:

detecting, via at least one processor of an electronic device executing instructions of a budget alert (BA) module, a trigger indicative of an intended transaction that falls within a first budget category having a budgeted amount for at least one budget period, wherein the trigger comprises movement of the electronic device to a pre-identified transaction location among stored pre-identified transaction locations, and detecting the trigger comprises:

monitoring, via a location sensor of the electronic device, for changes in a current location of the electronic device; and determining, in part via current location data received from the location sensor, location services of a navigation application, and stored pre-identified transaction locations, if the electronic device has moved to the pre-identified transaction location;

in response to detecting the trigger, transmitting, via a communication system of the electronic device over a communication network to a budget tracking repository, a request for budget data, the budget data including a corresponding first budget amount and first current spend amount associated with the first budget category for the at least one budget period, the budget tracking repository accessible, via a banking application of the electronic device, over the communication network;

receiving, in response to the request for budget data, the budget data via the communication network from the budget tracking repository;

transmitting, by the communication system over the communication network to a transaction data repository accessible via the communication network and different from the budget tracking repository, a request for transaction data associated with the intended transaction;

receiving, in response to the request for transaction data, the transaction data from the transaction data repository via the communication network;

identifying, via further execution of the BA module, an over-budget condition by determining that a first sum of a first payment amount for the intended transaction and the first current spend amount is greater than the first budget amount; and in response to identifying the over-budget condition, presenting a first budget alert on a display, the first budget alert indicating that the first budget amount will be exceeded if the intended transaction is completed within the at least one budget period.

14. The method of claim 13, wherein to identify the first payment amount for the intended transaction, the method further comprises at least one of:

retrieving historical data for purchase of a similar item as the intended transaction;

accessing a current cost listing for the intended transaction from an online retailer of the intended transaction; and identifying lower priced alternatives for the intended transaction and presenting a notification that lower priced alternatives for the intended transaction are available.

15. The method of claim 13, wherein to detect the trigger, the method further comprises:

detecting initiation of (i) at least one shopping application or (ii) at least one payment; and initiating processes resulting in presentation of the first budget alert, in response to detecting initiation of either (i) at least one shopping application or (ii) at least one payment, which is evaluated to potentially cause an over-budget condition.

16. The method of claim 13, further comprising:

identifying a first transaction type and the first payment amount for the intended transaction based on the transaction data; and identifying, from among a plurality of budget categories, the first budget category corresponding to the first transaction type.

17. The method of claim 13, wherein the method further comprises:

in response to determining the electronic device has moved to the pre-identified merchant location, initiating processing to determine whether the intended transaction, at the pre-identified merchant location, causes an over-budget condition that results in presentation of the first budget alert.

18. The method of claim 17, further comprising:

in response to determining the electronic device has moved to the pre-identified merchant location, retrieving a first average spend amount associated with previous transactions at the pre-identified merchant location;

determining if the first average spend amount, when added to the first current spend amount, is greater than the first budget amount; and in response to determining that the first average spend amount, when added to the first current spending amount, is greater than the first budget amount, presenting a second budget alert on the display, the second budget alert indicating that the electronic device is at the pre-identified merchant location where the first budget amount may be exceeded.

19. The method of claim 13, further comprising:

in response to transmitting the request for budget data, receiving, via the communication system from the budget tracking repository over the network, budget data of a plurality of budget categories including the first budget category, with corresponding budget amounts and current spend amounts for each of the plurality of budget categories for the at least one budget period;

combining budget amounts for each of the plurality of budget categories to provide an overall budget amount;

combining current spend amounts for each of the plurality of budget categories to provide an overall current spend amount;

determining if a second sum of the first payment amount and the overall current spend amount is greater than the overall budget amount; and in response to determining the second sum is greater than the overall budget amount, initiating presentation of a second budget alert on the display, the second budget alert indicating that the overall budget amount will be exceeded if the intended transaction is completed within the at least one budget period.

20. A computer program product comprising:

a non-transitory computer readable storage device having stored thereon program instructions of a budget alert (BA) module which, when executed by at least one processor of an electronic device having a display, a communication system, and a memory, configures the electronic device to complete functionality comprising:

detecting a trigger indicative of an intended transaction that falls within a first budget category having a budgeted amount for at least one budget period, wherein the trigger comprises movement of the electronic device to a pre-identified transaction location among stored pre-identified transaction locations, and detecting the trigger comprises:

monitoring, via a location sensor of the electronic device, for changes in a current location of the electronic device; and determining, in part via current location data received from the location sensor, location services of a navigation application, and stored pre-identified transaction locations, if the electronic device has moved to the pre-identified transaction location;

in response to detecting the trigger, transmitting, by the communication system over a communication network to a budget tracking repository, a request for budget data, the budget data including a corresponding first budget amount and first current spend amount associated with the first budget category for the at least one budget period, the budget tracking repository accessible, via a banking application of the electronic device, over the communication network;

receiving, in response to the request for budget data, the budget data via the communication network from the budget tracking repository;

transmitting, by the communication system over the communication network to a transaction data repository accessible via the communication network and different from the budget tracking repository, a request for transaction data associated with the intended transaction;

receiving, in response to the request for transaction data, the transaction data from the transaction data repository via the communication network;

identifying, via further execution of the BA module, an over-budget condition by determining that a first sum of a first payment amount for the intended transaction and the first current spend amount is greater than the first budget amount; and in response to identifying the over-budget condition, presenting a first budget alert on the display, the first budget alert indicating that the first budget amount will be exceeded if the intended transaction is completed within the at least one budget period.

* * * * *